United States Patent
Higashihara

(10) Patent No.: US 7,349,014 B2
(45) Date of Patent: Mar. 25, 2008

(54) IMAGE PICKUP APPARATUS, OPERATION PROCESSING METHOD THEREFOR, PROGRAM FOR IMPLEMENTING THE METHOD, AND STORAGE MEDIUM STORING THE PROGRAM

(75) Inventor: Masaki Higashihara, Kanagawa (JP)

(73) Assignee: Canon Kabushiki Kaisha (JP)

( * ) Notice: Subject to any disclaimer, the term of this patent is extended or adjusted under 35 U.S.C. 154(b) by 640 days.

(21) Appl. No.: 10/406,796

(22) Filed: Apr. 3, 2003

(65) Prior Publication Data

US 2004/0017480 A1 Jan. 29, 2004

(30) Foreign Application Priority Data

Apr. 3, 2002 (JP) .............................. 2002-101497

(51) Int. Cl.
*H04N 5/217* (2006.01)
*H04N 9/64* (2006.01)
(52) U.S. Cl. ........................ 348/241; 348/246; 348/251
(58) Field of Classification Search ................ 348/372, 348/374, 376, 241, 251, 246, 247, 187
See application file for complete search history.

(56) References Cited

U.S. PATENT DOCUMENTS 6,340,989 B1 * 1/2002 Oda ........................... 348/246
6,791,608 B1 * 9/2004 Miyazawa ................... 348/246
6,940,550 B2 * 9/2005 Kitawaki et al. ........... 348/246

FOREIGN PATENT DOCUMENTS

JP 11-234543 A 8/1999
JP 11-249004 A 9/1999

* cited by examiner

*Primary Examiner*—Lin Ye
*Assistant Examiner*—Nicholas G Giles
(74) *Attorney, Agent, or Firm*—Rossi, Kimms & McDowell LLP

(57) ABSTRACT

There is provided an image pickup apparatus which is capable of detecting foreign substances with ease and reliability regardless of a shooting condition. A foreign substance in the camera main body 101 is detected. The camera CPU 409 provides control such that a foreign substance detecting process is started when the power switch is turned on.

14 Claims, 18 Drawing Sheets

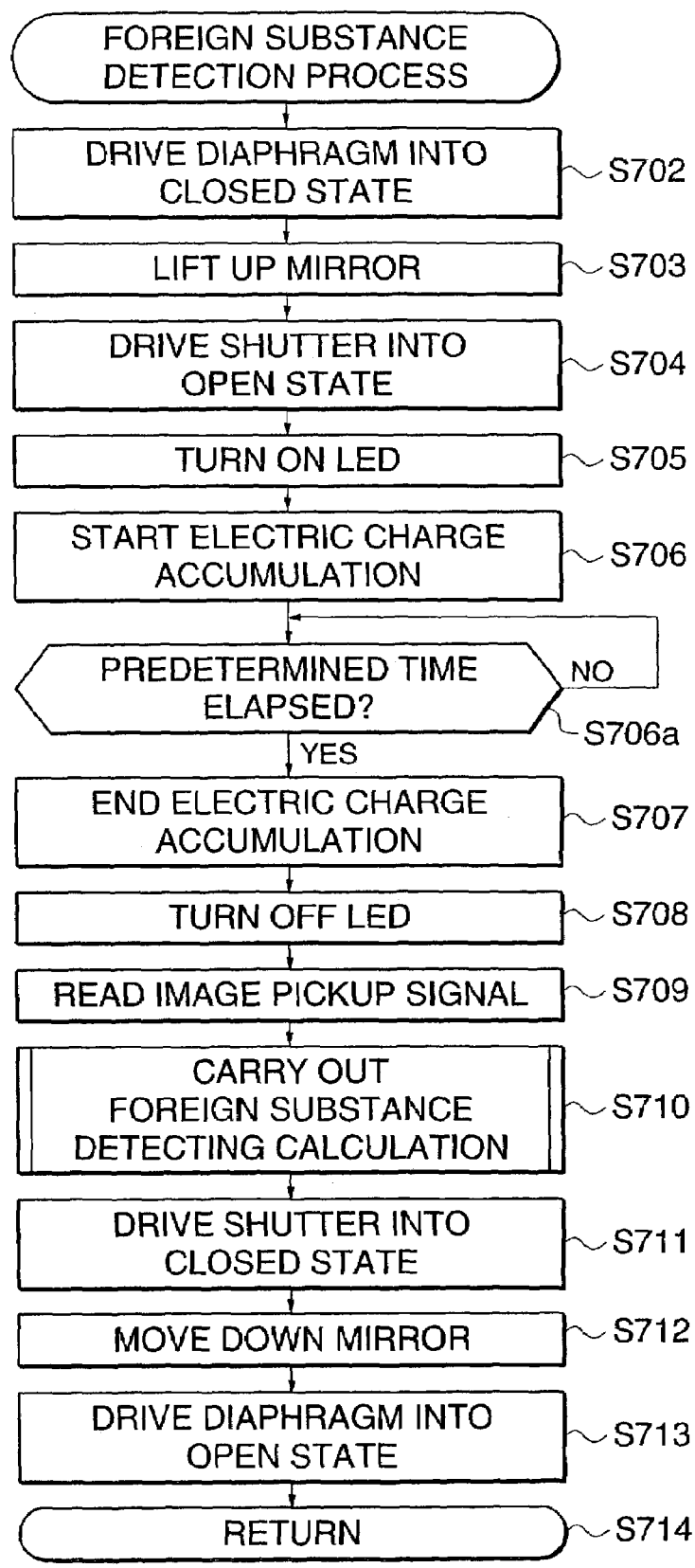

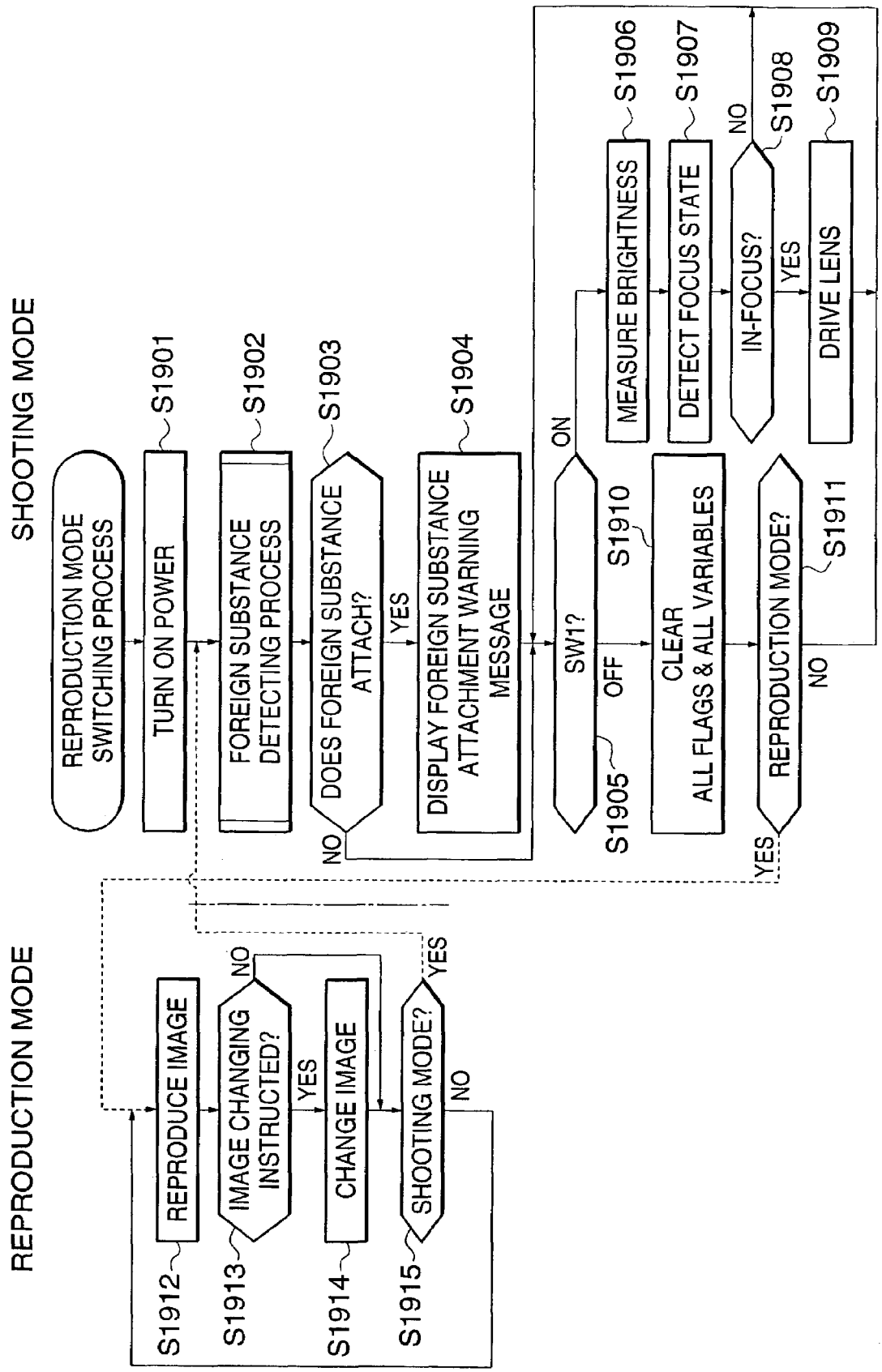

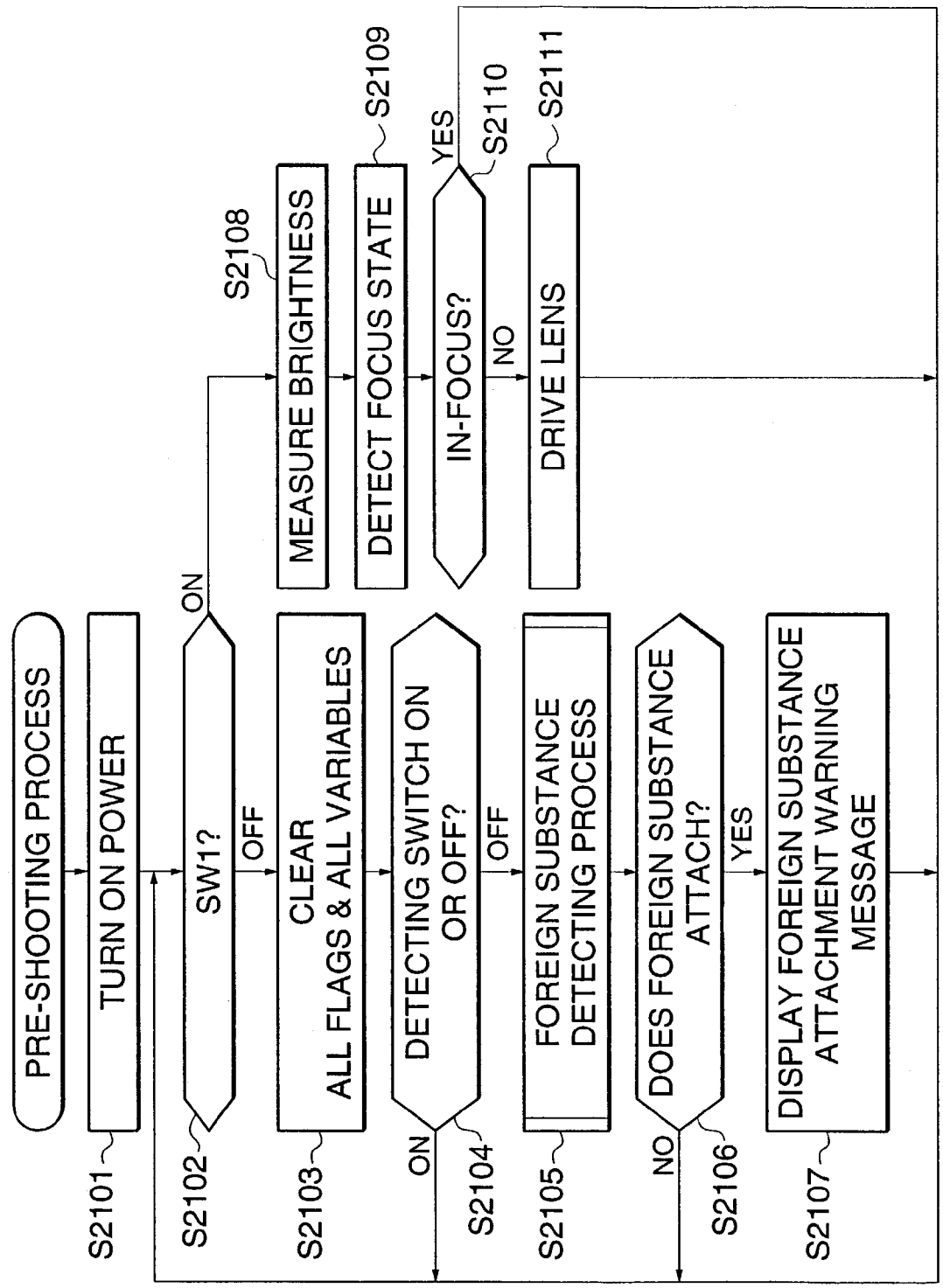

IMAGE PICKUP APPARATUS, OPERATION PROCESSING METHOD THEREFOR, PROGRAM FOR IMPLEMENTING THE METHOD, AND STORAGE MEDIUM STORING THE PROGRAM

BACKGROUND OF THE INVENTION

1. Field of the Invention

The present invention relates to an image pickup apparatus, such as a digital camera, which has a body thereof provided with a foreign substance detecting means for detecting foreign substance attaching to an image pickup optical system, and an operation processing method for the image pickup apparatus, a program for implementing the method, and a storage medium storing the program.

2. Description of the Related Art

In a digital single-lens reflex camera with an interchangeable lens, a foreign substance like dust or dirt existing in the camera main body may move due to interchanging of the lens, driving of a mirror, or an operation of a shutter, and adhere to the surface of a cover glass of an image pickup element of an image pickup optical system or the surface of an optical low-pass filer, an infrared cut filter, or the like disposed in the vicinity of the image pickup element. If shooting is carried out without removing the attaching foreign substance, the shadow of the foreign substance is imaged onto the image pickup element together with the image of a subject and therefore it becomes impossible to carry out shooting in a satisfactory manner.

To solve such a problem, there has been proposed an image pickup apparatus in which optical filters, such as a low-pass filter and an infrared cut filter, are disposed spaced from an image pickup element, and the space formed between the optical filters and the image pickup element is hermetically sealed and hence kept clean, thereby preventing a foreign substance from entering into the vicinity of the image pickup element.

Also, Japanese Laid-Open Patent Publication (Kokai) No. 11-234543 has proposed an image pickup apparatus (video camera) that detects a stain on a taking lens using an output signal of an image pickup element. The proposed image pickup apparatus detects a stain on the taking lens by detecting a fixed low-frequency component in a moving image that is being shot.

Also, Japanese Laid-Open Patent Publication (Kokai) No. 11-249004 has proposed a detecting method and a means for correcting an output signal of an image sensor, which are for use in a case where a foreign substance attaches to an image pickup optical system adopting a phase difference detecting system that is applied to a single-lens reflex camera or the like. With the proposed detecting method and correcting means, a difference value between adjacent pixels in an output signal of the image sensor that is uniformly illuminated is integrated and foreign substance detection is carried out as to whether the obtained integral value is greater than a predetermined value. When a foreign substance is detected, sensitivity correcting data for each pixel is changed such that the output signal of the image sensor lowered in level by the foreign substance assumes a normal value.

In the case of a single-lens reflex camera for which the flange back of an interchangeable lens is fixed, however, if the image pickup element is small, it is possible to secure a required space between filters and the image pickup element. However, due to increase in the size of the image pickup element with a recent increase in the number of pixels, it becomes difficult to secure such a required space.

Further, the above-mentioned shadow of a foreign substance is blurred on the image pickup element depending on the attaching position and size of the foreign substance and the exposure value of the taking lens, so that it is difficult to grasp the adverse effect of the foreign substance. Therefore, the photographer continues shooting without recognizing attachment of the foreign substance, and after the shooting, finds the adverse effect of the foreign substance in a scene having a different shooting condition.

Therefore, there is growing necessity to detect a foreign substance that can exert an adverse effect on shooting results with ease and reliability before shooting.

SUMMARY OF THE INVENTION

It is, therefore, an object of the present invention to provide an image pickup apparatus and an operation processing method therefor, which are capable of detecting foreign substances with ease and reliability regardless of a shooting condition, and a program for implementing the method and a storage medium storing the program.

To attain the above object, in a first aspect of the present invention, there is provided an image pickup apparatus comprising an image pickup apparatus body, a power switch provided in the image pickup apparatus body, a foreign substance detecting device that detects a foreign substance in the image pickup apparatus body, and a controller that provides control such that the foreign substance detecting device is activated when the power switch is turned on.

To attain the above object, in a second aspect of the present invention, there is provided an image pickup apparatus comprising an image pickup apparatus body, a power switch provided in the image pickup apparatus body, an image pickup apparatus body having a power switch, a foreign substance detecting device that detects a foreign substance in the image pickup apparatus main body, and a controller that provides control such that the foreign substance detecting device is activated when the power switch is switched from an ON state to an OFF state.

To attain the above object, in a third aspect of the present invention, there is provided an image pickup apparatus comprising an image pickup apparatus body, a foreign substance detecting device that detects a foreign substance in the image pickup apparatus body, a foreign substance detecting switch for starting foreign substance detection by the foreign substance detecting device, a switch detecting device that detects whether the foreign substance detecting switch has been operated, and a controller that provides control such that the foreign substance detecting device is activated when the switch detecting device detects that the foreign substance detecting switch has been operated.

To attain the above object, in a fourth aspect of the present invention, there is provided an image pickup apparatus comprising an image pickup apparatus body, a foreign substance detecting device that detects a foreign substance in the image pickup apparatus body, a lens attachment detecting device that detects whether a lens has been attached to the image pickup apparatus main body, and a controller that provides control such that the foreign substance detecting device is activated when the lens attachment detecting device detects that a lens has been attached to the image pickup apparatus main body.

To attain the above object, in a fifth aspect of the present invention, there is provided an image pickup apparatus comprising an image pickup apparatus body, a foreign substance detecting device that detects a foreign substance in the image pickup apparatus body, a counter that counts a number of times of shooting operations by the image pickup apparatus after a preceding foreign substance detecting operation by the foreign substance detecting device, and a controller that provides control such that the foreign substance detecting device is activated when a count value of the counter reaches a predetermined value.

To attain the above object, in a sixth aspect of the present invention, there is provided an image pickup apparatus comprising an image pickup apparatus body, a foreign substance detecting device that detects a foreign substance in the image pickup apparatus body, a mode detecting device that detects whether a control mode of the image pickup apparatus has shifted from a shooting mode for carrying out shooting to a reproduction mode for reproducing a shot image, and controller that provides control such that the foreign substance detecting device is activated when the mode detecting device detects that the control mode has shifted from the shooting mode to the reproduction mode.

To attain the above object, in a seventh aspect of the present invention, there is provided an image pickup apparatus comprising an image pickup apparatus body, a foreign substance detecting device that detects a foreign substance in the image pickup apparatus body, a mode detecting device that detects whether a control mode of the image pickup apparatus has shifted from a reproduction mode for reproducing a shot image to a shooting mode for carrying out shooting, and a controller that provides control such that the foreign substance detecting device is activated when the mode detecting device detects that the control mode has shifted from the reproduction mode to the shooting mode.

To attain the above object, in a eighth aspect of the present invention, there is provided an image pickup apparatus comprising an image pickup apparatus body, a foreign substance detecting device that detects a foreign substance in the image pickup apparatus body, a data recording device that records image data, an attachment detecting device that detects whether the data recording device has been attached to the image pickup apparatus body, and a controller that provides control such that the foreign substance detecting device is activated when the attachment detecting device detects that the data recording device has been attached to the image pickup apparatus body.

Preferably, in the image pickup apparatuses according to the first to eighth aspects, the foreign substance detecting device detects a foreign substance attaching to the image pickup optical system.

Preferably, in the image pickup apparatuses according to the first to eighth aspects, there is provided an image pickup apparatus comprising an interchangeable taking lens according to any of the first to eighth aspects of the present invention, To attain the above object, in a ninth aspect of the present invention, there is provided a method of processing operation of an image pickup apparatus having an image pickup apparatus body, and a power switch provided in the image pickup apparatus body comprising a foreign substance detecting step of detecting a foreign substance in the image pickup apparatus body, and a control step of providing control such that the foreign substance detecting step is executed when the power switch is turned on.

To attain the above object, in a tenth aspect of the present invention, there is provided a method of processing operation of an image pickup apparatus having an image pickup apparatus body, and a power switch provided in the image pickup apparatus body comprising a foreign substance detecting step of detecting a foreign substance in the image pickup apparatus body, and a control step of providing control such that the foreign substance detecting step is executed when the power switch is switched from an ON state to an OFF state.

To attain the above object, in an eleventh aspect of the present invention, there is provided a method of processing operation of an image pickup apparatus having an image pickup apparatus body, and a foreign substance detecting switch comprising a foreign substance detecting step of detecting a foreign substance in the image pickup apparatus body, a switch detecting step of detecting whether the foreign substance switch has been operated to start foreign substance detection in the foreign substance detecting step, and a control step of providing control such that the foreign substance detecting step is executed when it is detected in the switch detecting step that the foreign substance detecting switch has been operated.

To attain the above object, in a twelfth aspect of the present invention, there is provided a method of processing operation of an image pickup apparatus having an image pickup apparatus body comprising a foreign substance detecting step of detecting a foreign substance in the image pickup apparatus body, a lens attachment detecting step of detecting whether a lens has been attached to the image pickup apparatus body, and a control step of providing control such that the foreign substance detecting step is executed when it is detected in the lens attachment detecting step that a lens has been attached to the image pickup apparatus main body.

To attain the above object, in a thirteenth aspect of the present invention, there is provided a method of processing operation of an image pickup apparatus having an image pickup apparatus body comprising a foreign substance detecting step of detecting a foreign substance in the image pickup apparatus body, a counting step of counting a number of times of shooting operations by the image pickup apparatus after a preceding foreign substance detecting operation executed in the foreign substance detecting step, and a control step of providing control such that the foreign substance detecting step is executed when a count value of the counting step reaches a predetermined value.

To attain the above object, in a fourteenth aspect of the present invention, there is provided a method of processing operation of an image pickup apparatus having an image pickup apparatus body comprising a foreign substance detecting step of detecting a foreign substance in the image pickup apparatus body, a mode detecting step of detecting whether a control mode of the image pickup apparatus has shifted from a shooting mode for carrying out shooting to a reproduction mode for reproducing a shot image, and a control step of providing control such that the foreign substance detecting step is executed when it is detected in the mode detecting step that the control mode has shifted from the shooting mode to the reproduction mode.

To attain the above object, in a fifteenth aspect of the present invention, there is provided a method of processing operation of an image pickup apparatus having an image pickup apparatus body comprising a foreign substance detecting step of detecting a foreign substance in the image pickup apparatus body, a mode detecting step of detecting whether a control mode of the image pickup apparatus has shifted from a reproduction mode for reproducing a shot image to a shooting mode for carrying out shooting, and a control step of providing control such that the foreign substance detecting step is executed when it is detected in the mode detecting step that the control mode has shifted from the reproduction mode to the shooting mode.

To attain the above object, in a sixteenth aspect of the present invention, there is provided a method of processing operation of an image pickup apparatus having an image pickup apparatus body, and a data recording device that records image data comprising a foreign substance detecting step of detecting a foreign substance in the image pickup apparatus body, an attachment detecting step of detecting whether the data recording device has been attached to the image pickup apparatus body, and a control step of providing control such that the foreign substance detecting step is executed when it is detected in the detecting step that the data recording device has been attached to the image pickup apparatus body.

To attain the above object, the present invention further provides a program for implementing a method of processing operation of an image pickup apparatus according to any of the ninth to sixteenth aspects.

To attain the above object, the present invention further provides a storage medium storing the above program.

According to the present invention, timing in which the foreign substance detecting device for detecting a foreign substance attaching to the image pickup optical system is activated is controlled, whereby it is possible to carry out detection of attachment of a foreign substance without interfering the shooting operation.

The above and other objects, features, and advantages of the invention will become more apparent from the following detailed description taken in conjunction with the accompanying drawings.

BRIEF DESCRIPTION OF THE DRAWINGS

FIG. 7 is a flowchart showing a foreign substance detecting process carried out in step S502 in FIG. 5;

FIG. 15 is a flowchart showing a reproduction mode switching process carried out by a digital single-lens reflex camera as an image pickup apparatus according to a seventh embodiment of the present invention; and FIG. 16 is a flowchart showing a pre-shooting process carried out by a digital single-lens reflex camera as an image pickup apparatus according to an eighth embodiment of the present invention.

DETAILED DESCRIPTION OF THE PREFERRED EMBODIMENTS

The present invention will now be described in detail with reference to the accompanying drawings showing preferred embodiments thereof.

First Embodiment

First, a description will be given of a first embodiment of the present invention with reference to FIGS. 1 to 8.

An image pickup apparatus according to the present embodiment is configured such that a foreign substance detecting operation is carried out upon detection of a power switch of the main body of the image pickup apparatus being switched from an OFF state to an ON state. With this configuration, a pre-shooting process for checking whether there is adherence of any foreign substance is carried out before shooting without fail, so that it becomes unnecessary to carry out foreign substance detection during actual shooting. By virtue of this shooting preparation process, the photographer can concentrate on the shooting operation and will never be bothered by foreign substance detection if carried out during shooting.

Figure 1:
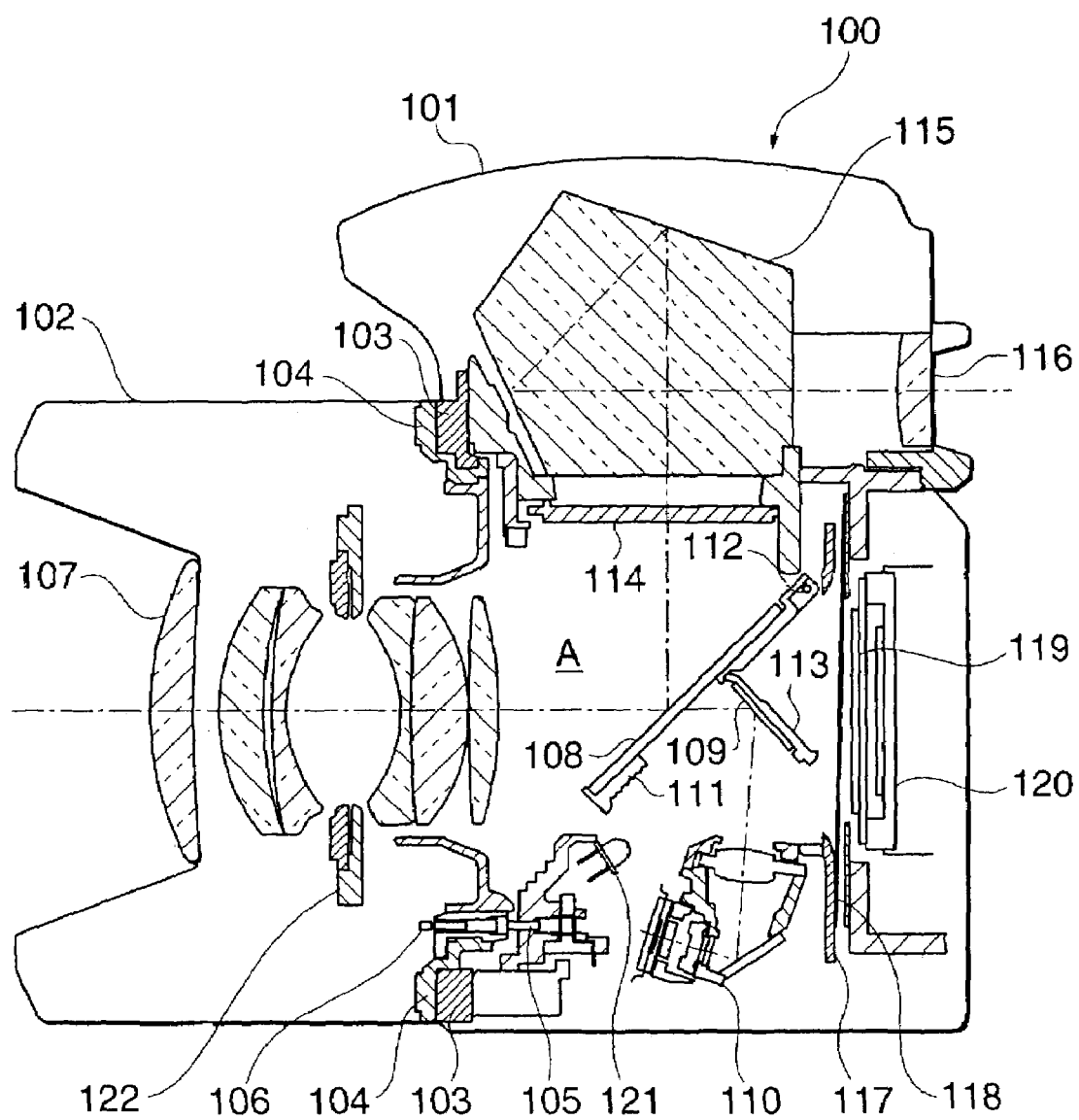
FIG. 1 is a vertical longitudinal cross-sectional view showing the schematic construction of a digital single-lens reflex camera as an image pickup apparatus according to a first embodiment of the present invention, which is in a standby state.

FIG. 1 is a vertical longitudinal cross-sectional view showing the schematic construction of a digital single-lens reflex camera as an image pickup apparatus according to the first embodiment of the present invention, with the digital single-lens reflex camera being placed in a standby state. In FIG. 1, the digital single-lens reflex camera 100 is comprised of a camera main body (image pickup apparatus body) 101 and an interchangeable lens 102 that is detachably attached to the camera main body 101. The interchangeable lens 102 includes a taking lens 107, a mount portion 104, and a contact portion 106. The mount portion 104 is fixed to a mount portion 103 of the camera main body 101. An electric connection is established by a contact portion 105 of the camera main body 101 contacting with the contact portion 106 of the interchangeable lens 102, whereby, through the contact portions 105 and 106, electric power is supplied from the camera main body 101 to the interchangeable lens 102, communication for controlling the taking lens 107 and the like is carried out A light flux passing through the taking lens 107 of the interchangeable lens 102 is incident on a main mirror 108 of the camera main body 101. The main mirror 108 is a half mirror such that a light flux reflected by the main mirror 108 is guided to a finder and a light flux passing through the main mirror 108 is reflected downward by a sub-mirror 109 and is guided to a focus detecting device 110.

The focus detecting device 110 detects a defocus amount of the taking lens 107, calculates a lens driving amount for driving the taking lens 107 such that the taking lens 107 is brought into an in-focus state, and sends the lens driving amount to the interchangeable lens 102 through the contact portions 105 106, and the interchangeable lens 102 carries out focus adjustment by driving the taking lens 107 through control of a motor, not shown.

The main mirror 108 is fixed via bonding to a main mirror holding frame member 111 and is rotatably supported by a hinge axis 112. Also, the sub-mirror 109 is fixed via bonding to a sub-mirror holding frame 113 and is rotatably supported by a hinge axis, not shown, with respect to the main mirror holding frame 111.

The light flux guided by the main mirror 108 to the finder forms a subject image on a focussing screen 114 such that the photographer can observe the subject image on the focussing screen 114 through a pentaprism 115 and an eyepiece 116.

At a location rearward of the sub-mirror 109, a shutter 117 is disposed and its shutter screen 118 is normally placed in a closed state.

At the rear of the shutter 117, an optical filter 119, which is comprised of an optical low-pass filter and an infrared cut filter formed in one body, is disposed. At the time of shooting, a light flux passing through the optical filter 119 is incident on an image pickup element 120 disposed at the rear of the optical filter 119. Reference numeral 121 denotes an LED (Light-Emitting Diode), which illuminates the image pickup element 120 from the bottom of a mirror box (mirror space) at the time of foreign substance detection. Reference numeral 122 denotes a diaphragm of the interchangeable lens 102.

The digital single-lens reflex camera 100 in the standby state is generally constructed as described above.

With the above described construction in which the image pickup element 120, which is large in size, is mounted in the digital single-lens reflex camera 100, it is impossible to reduce the sizes of the focussing screen 114 and the main mirror 108, which makes it difficult to secure a sufficient space between the optical filter 119 and the image pickup element 120. Accordingly, the distance between a foreign substance like dust attaching to the optical filter 119 and the image pickup element 120 inevitably becomes short, so that the shadow of the foreign substance is not greatly blurred and superposed upon a subject image on the image pickup element 120. An image shot under such a state contains a black shadow of the foreign substance and therefore its image quality is significantly degraded. Therefore, it is necessary to detect such a foreign substance before shooting and remove (clean) the foreign substance as required.

Figure 2:
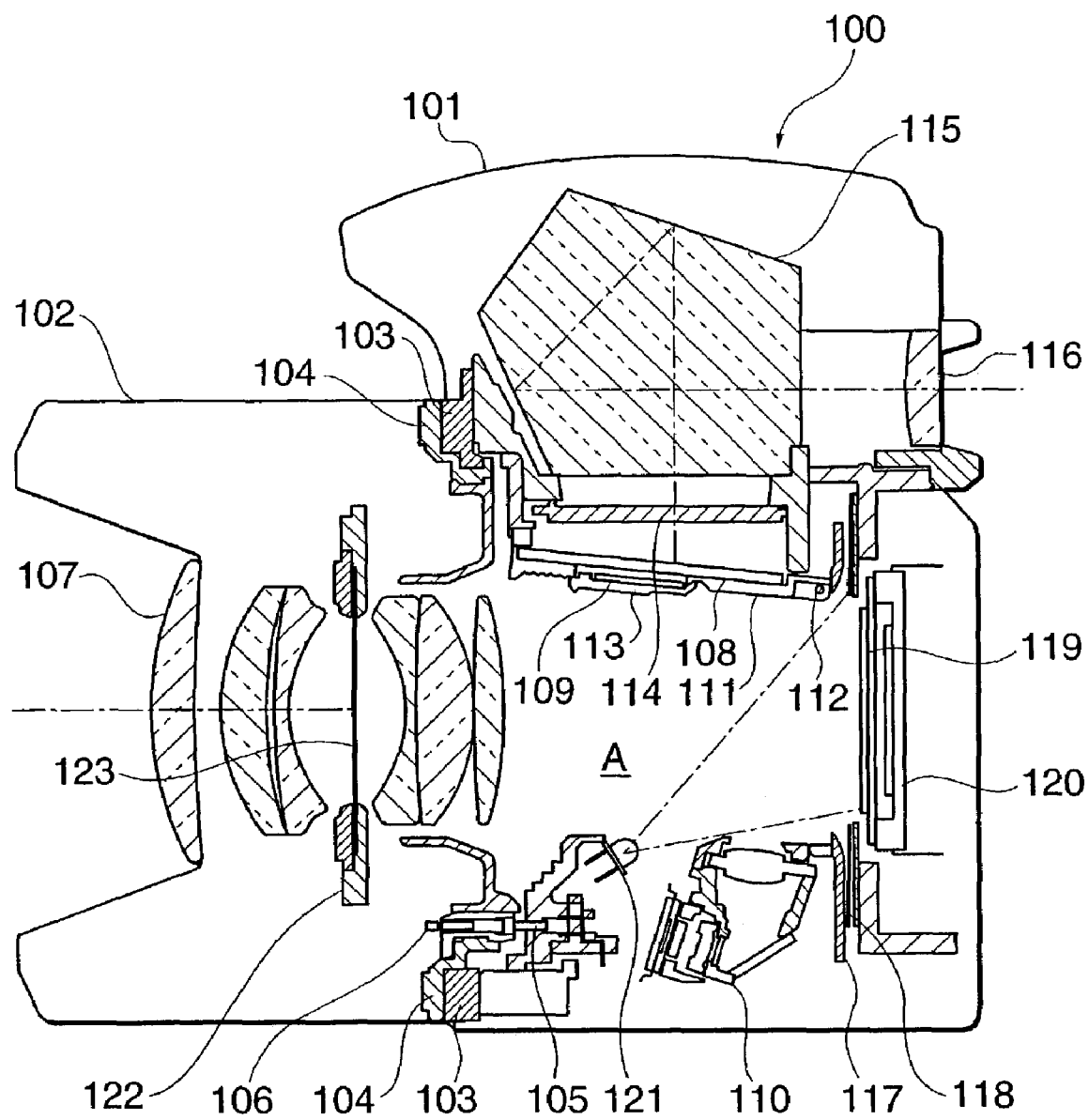
FIG. 2 is a vertical longitudinal cross-sectional view showing the schematic construction of the digital single-lens reflex camera 100 in a state where foreign substance detection is being carried out.

FIG. 2 is a vertical longitudinal cross-sectional view showing the schematic construction of the digital single-lens reflex camera 100 in a state where foreign substance detection is being carried out.

When the foreign substance detection is carried out, it is necessary to darken the inside of the mirror box A. Therefore, first, the main mirror 108 and the sub-mirror 109 are retracted by carrying out a mirror-up operation, thereby causing the main mirror holding frame 111 and the sub-mirror holding frame 113 to block a light flux from entering through the eyepiece 116 of the finder. Next, by carrying out communication through the contact portion 105 of the camera main body 101 and the contact portion 106 of the interchangeable lens 102, a diaphragm blade 123 of the diaphragm 122 of the interchangeable lens 102 is caused to block a light flux from entering through the taking lens 107. Then, the shutter screen 118 of the shutter 117 is caused to travel into an open position.

After light from the outside is blocked in this manner and the light-blocking member is removed from between the LED 121 and the image pickup element 120, the image pickup element 120 is uniformly illuminated by the LED 121. Under this state, the image pickup element 120 accumulates electric charge and reading of an image signal. Then, the image pickup element 120 judges whether or not there is a foreign substance on the optical filter 119 from the read image signal.

The manner of blurring of the shadow of a foreign substance generated by a light flux entering through the taking lens 107 changes depending on the exposure value of the taking lens 107. That is, when a bright taking lens 107 is used at an open aperture, the shadow of a foreign substance greatly blurs, so that it becomes impossible to find out a small foreign substance. Also, when the diaphragm 122 of the interchangeable lens 102 is stopped down or a dark taking lens 107 is used, the shadow of a foreign substance does not so blur, so that it is possible to find out the shadow of a relatively small foreign substance.

If the detection of a foreign substance is carried out using a light flux entering through the taking lens 107 in this manner, there arises a problem that the foreign substance size that can be detected changes depending on the taking lens 107 and the shooting condition, making it impossible to carry out the foreign substance detection with reliability.

Also, if a light flux passing through the taking lens 107 is used, there arises a problem that a subject image, which is also formed on the image pickup element 120, can be erroneously judged as a foreign substance, which makes it impossible to carry out the foreign substance detection with accuracy.

In the present embodiment, on the other hand, the image pickup element 120 is illuminated using the LED 121 that is similar to a point light source, whereby the shadow of a foreign substance is hardly blurred. As a result, even a small foreign can be detected. Further, the detection is not affected by the shooting condition and the taking lens 107, making it possible to carry out accurate foreign substance detection with reliability.

Figure 3:
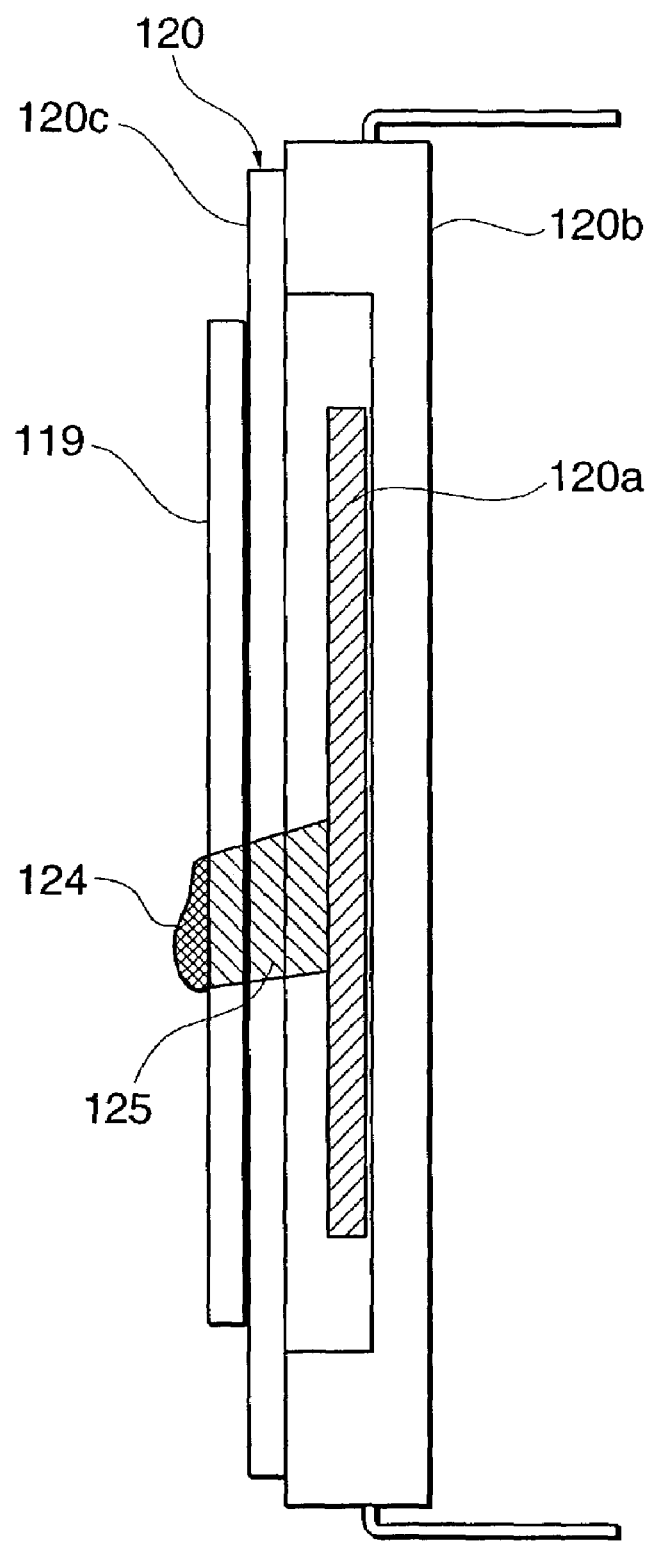
FIG. 3 is an enlarged view showing an image pickup element 120 in FIG. 2 and its related parts.

FIG. 3 is an enlarged view showing the image pickup element 120 in FIG. 2 and its related parts. The image pickup element 120 is comprised of an image pickup portion 120*a*, a ceramic package 120*b*, and a cover glass sheet 120*c*.

FIG. 3 shows a state where a foreign substance 124 attaches to the surface of the optical filter 119 located just in front of the cover glass sheet 120*c* of the image pickup element 120. Illumination light from the LED 121 is blocked by the foreign substance 124 to form a shadow 125. An image represented by an output signal from the image pickup element 120 contains a portion corresponding to the shadow 125 which is lower in level than its ambient portions. Therefore, by detecting such a signal image portion which is lower in level, it is possible to detect a foreign substance attaching to the optical filter 119.

Figure 4:
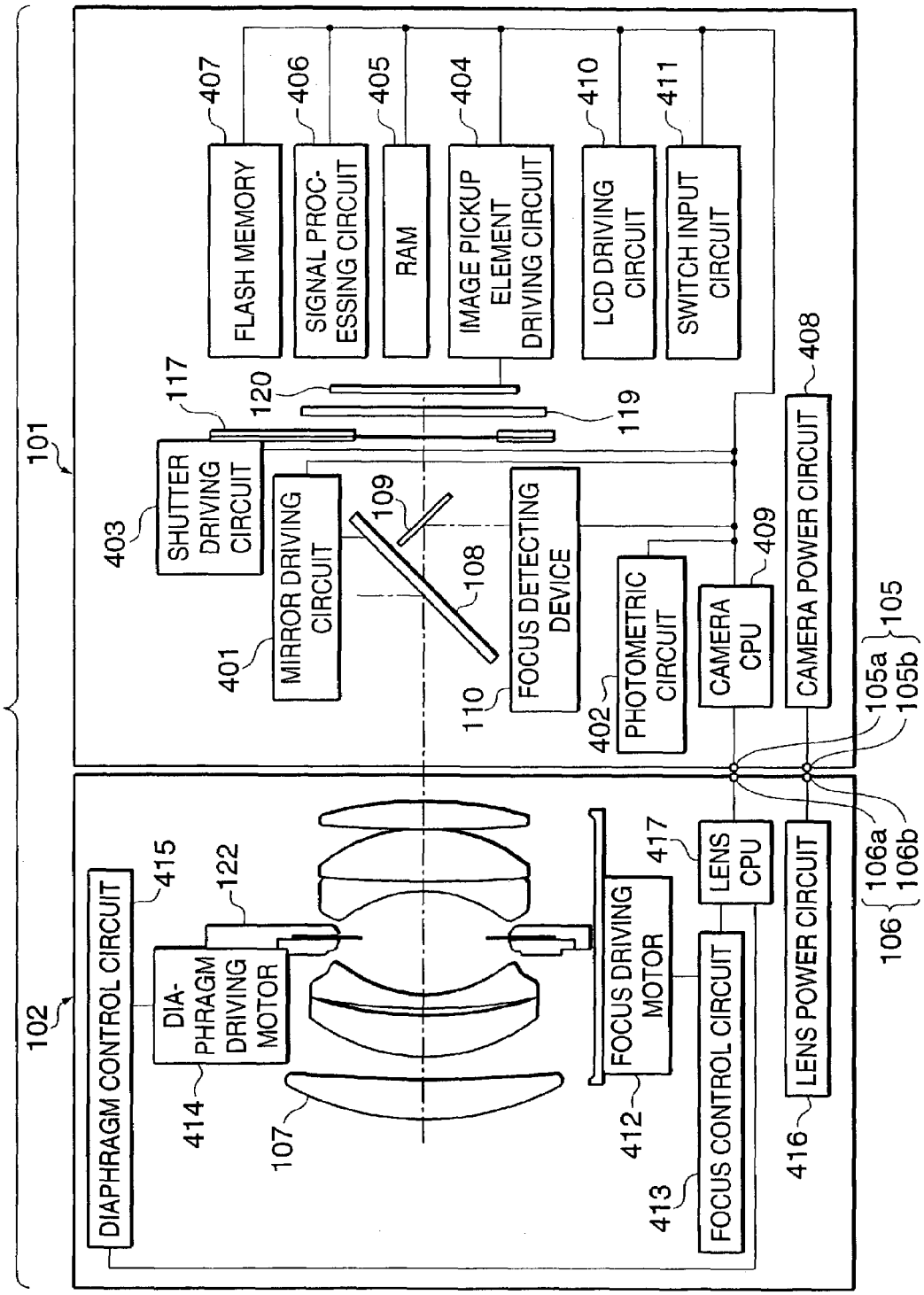
FIG. 4 is a circuit diagram showing the configuration of electronic circuitry of the digital single-lens reflex camera 100.

FIG. 4 is a circuit diagram showing the configuration of electronic circuitry of the digital single-lens reflex camera 100. In the figure, elements and parts corresponding to those in FIG. 1 are denoted by identical reference numerals.

As shown in FIG. 4, the camera main body 101 and the interchangeable lens 102 are connected to each other via communication contacts 105*a* and 106*a* and power contacts 105b and 106b. The camera main body 101 is provided with a mirror driving circuit 401 that drives the main mirror 108 and the sub-mirror 109, a focus detecting device 110 that detects a defocus amount of the taking lens 107, a photometric circuit 402 that measures the brightness of a subject to determine an exposure condition at the time of shooting, a shutter driving circuit 403 that drives the shutter screen 118 of the shutter 117, the LED 121 that illuminates the image pickup element 120 in carrying out detection of a foreign substance attaching to the optical filter 119, an image pickup element driving circuit 404 that drives the image pickup element 120 and reads of an image pickup signal from the image pickup element 120, a RAM (Random-Access Memory) 405 that stores the read image pickup signal, a signal processing circuit 406 that converts the image pickup signal stored in the RAM 405 into image data of a predetermined format, a flash memory 407 that stores the image data, a camera power circuit 408 that supplies power to various electric circuits in the camera main body 101 and the interchangeable lens 102, a camera CPU 409 that controls the taking lens 107 through control of the above-mentioned circuits and communication with the interchangeable lens 102, an LCD driving circuit 410 that drives an LCD, not shown, functioning as a display device, and a switch input circuit 411.

The interchangeable lens 102 is provided with a lens unit including the taking lens 107, a focus driving motor 412 that carries out focus adjustment of the taking lens 107 based on the defocus amount detected by the focus detecting device 110 of the camera main body 101, a focus control circuit 413 that controls the focus driving motor 412, a diaphragm driving motor 414 that drives the diaphragm blade 123 of the diaphragm 122, a diaphragm control circuit 415 that controls the diaphragm driving motor 414, a lens power circuit 416 that supplies power to various electric circuits in the interchangeable lens 102, and a lens CPU 417 that controls the above-mentioned electric circuits based on results of communication with the camera CPU 409.

To block a light flux entering through a finder optical system, the camera CPU 409 sets the main mirror 108 and the sub-mirror 109 into a mirror-up state through control of the mirror driving circuit 401. To block a light flux entering through the taking lens 107, the camera CPU 409 sends the lens CPU. 417 an instruction for blocking light by closing the diaphragm 122. Upon receiving this instruction, the lens CPU 417 drives the diaphragm driving motor 414 by a predetermined amount through control of the diaphragm control circuit 415, thereby block the light flux entering through the taking lens 107 by the diaphragm blade 123 of the diaphragm 122.

To set the shutter 117 into an open state, the camera CPU 409 controls the shutter driving circuit 403 so that the shutter screen 118 is caused to travel to set the shutter 117 into the open state.

To carry out the foreign substance detection, the image pickup element 120 is illuminated by the LED 121 and the shadow of a foreign substance attaching to the optical filter 119 is detected from an image pickup signal read from the image pickup element 120. To carry out the foreign substance detection from the image pickup signal, the signal processing circuit 406 converts the image pickup signal into image data and extracts a brightness component from the image data. Then, if an image portion whose brightness value is smaller than a predetermined value, the image portion is determined to have a foreign substance attaching thereto.

When the presence of a foreign substance is detected, the camera CPU 409 displays information indicating the attachment of the foreign substance on the LCD (Liquid Crystal Display), not shown, for displaying various information through control of the LCD through the LCD driving circuit 410, thereby informing the photographer of the attachment of the foreign substance to the image pickup optical system.

In this way, it is possible for the photographer to easily find whether there is attachment of a foreign substance by looking at the information displayed on the LCD, so that the photographer can easily decide whether it is required to carry out cleaning to remove the foreign substance before shooting. As a result, it is possible to prevent an accident as in the prior art in which a foreign substance is taken as part of a shot image and the photographer notices attachment of the foreign substance by observing the shot image with care.

Next, the operation of the digital single-lens reflex camera 100 as an image pickup apparatus according to the present embodiment will be described with reference to FIGS. 5 to 6B.

FIGS. 5 to 8 are flowcharts of a pre-shooting process carried out by the digital single-lens reflex camera 100 as an image pickup apparatus according to the first embodiment.

Figure 5:
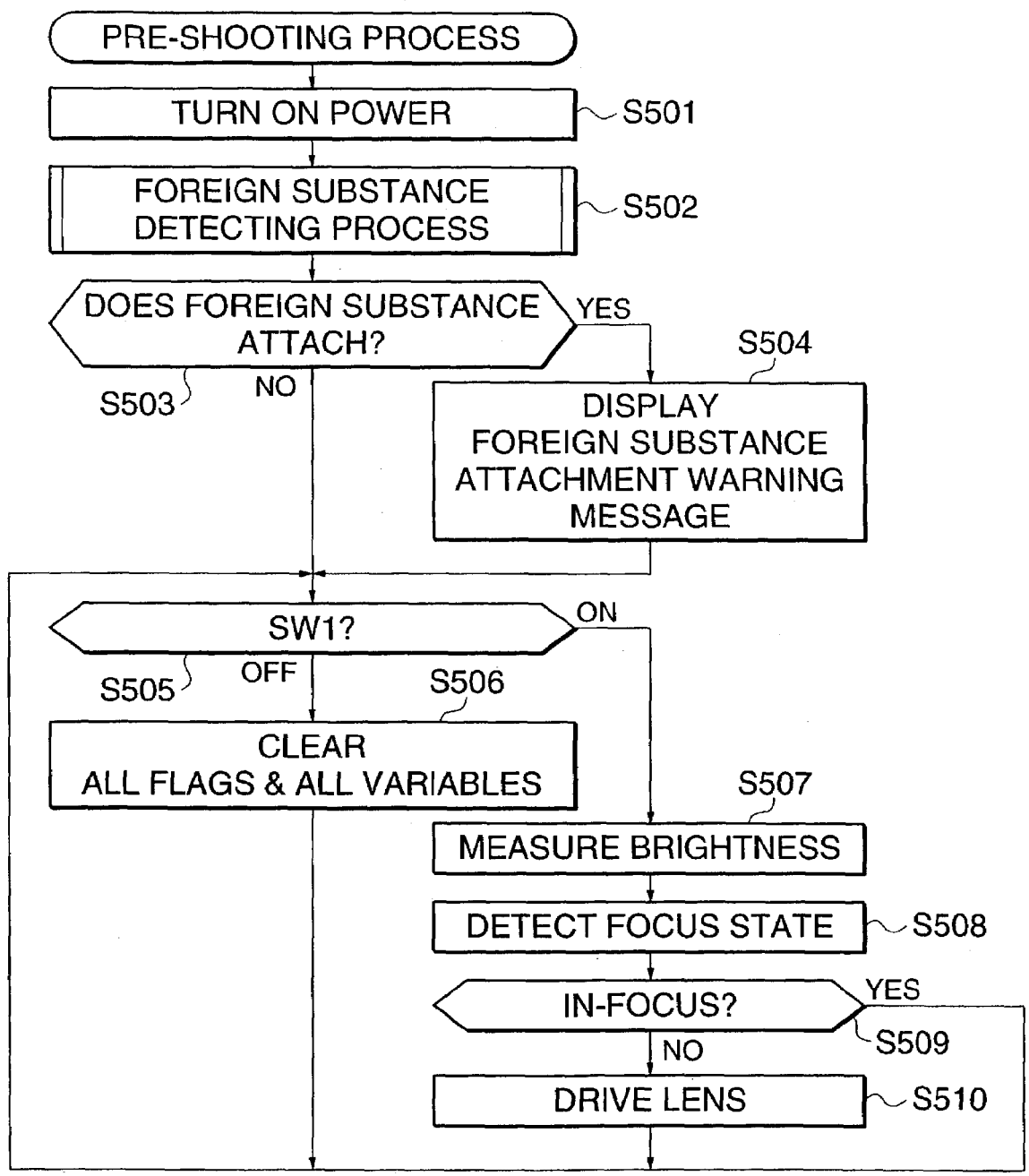
FIG. 5 is a flowchart showing a pre-shooting process carried out by the digital single-lens reflex camera 100.

Referring now to FIG. 5, first, in step S501, when the power switch of the camera main body 101 is switched from an OFF state to an ON state, the camera CPU 409 reads a predetermined program for carrying out the present process from a ROM (Read-Only Memory), not shown.

Next, the process proceeds to step S502 to carry out a foreign substance detecting process for detecting whether a foreign substance attaches to the optical filter 119 in the vicinity of the image pickup element 120.

Next, the process proceeds to step S503 in which it is determined whether there is attachment of a foreign substance or not, from a GF flag that is set or reset with reference to a result of the foreign substance detecting process carried out in step S502 described above. That is, the GF flag is set if it is determined that attachment of a foreign substance occurs, and is reset if it is determined that there is no foreign substance attachment. When the GF flag is set as a result of the determination in step S503, that is, foreign substance attachment occurs, the process proceeds to step S504. On the other hand, When the GF flag is reset, that is, no foreign substance attachment occurs, the process proceeds to step S505.

In step S504, the LCD driving circuit 410 is controlled to cause the display a warning message for informing the photographer of the attachment of the foreign substance. Then, after the warning message is displayed, the process proceeds to the next step S505. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby making it possible to start shooting under a favorable condition.

In this way, the foreign substance detection is carried out when the power switch of the camera main body 101 is switched from the OFF state to the ON state, thereby providing an effect that it is possible for the photographer to confirm the state of the camera main body 101 before shooting and therefore carry out the shooting with assurance.

In step S505, detection is made of the state of a switch SW1 which is turned on by a first stroke of the release button, not shown, of the camera main body 101 for carrying out an image pickup operation. If the switch SW1 is ON, the process proceeds to step S507. On the other hand, if the switch SW1 is OFF, the process proceeds to step S506.

In step S506, to return the contents of the RAM 405 storing various kinds of parameters applied to control of the camera main body 101 into an initial state, all flags and all variables are cleared. After this step S506 is executed, the process returns to step S505.

Next, in step S507, as a shooting preparation operation, the brightness of a subject is measured from a photometric sensor output of the photometric circuit 402 and an exposure condition at the time of shooting (exposure value and shutter speed) is calculated.

Then, the process proceeds to step S508 in which the focus state (defocus amount) of the taking lens 107 is detected by the focus detecting device 110. Then, the process proceeds to step S509 in which it is determined whether the taking lens 107 is in an in-focus state or not, from whether the defocus amount detected in step S508 is smaller than a predetermined value or not. Then, when the defocus amount is smaller than the predetermined value and the taking lens 107 is in the in-focus state, the process returns to step S505. On the other hand, when the defocus amount is larger than the predetermined value and the taking lens 107 is in a defocus state, the process proceeds to the next step S510.

In step S510, the taking lens 107 is driven by the focus driving motor 412 so as to cancel the defocus amount detected in step S508. Then, after the step S510 is executed, the process returns to step S505.

The operations in steps S505 to S510 are repeatedly executed. However, when the power switch is turned off, all of the operations are immediately terminated, and when the power switch is again turned on, the processing starting from step S501 is again carried out.

If the photographer further depresses the release button while the steps S507 to S510 described above are being executed, a switch SW2 that is turned on upon a second stroke of the release button is turned on and the camera CPU 409 carries out a switch SW2 interrupt process shown in FIGS. 6A-6B, described below.

Figure 6A:
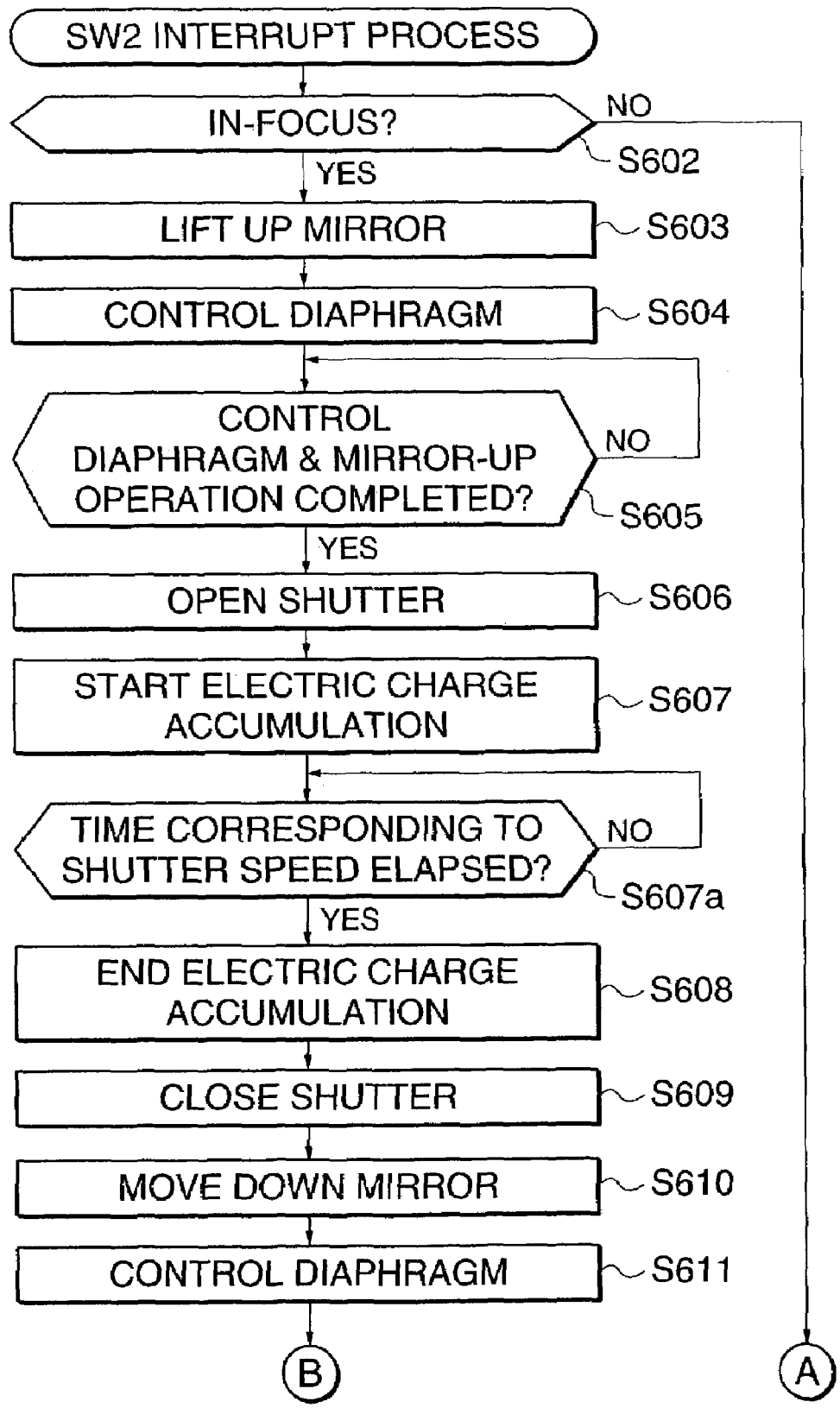
FIGS. 6A-6B is a flowchart showing a switch SW2 interrupt process carried out during operations in steps S505 to S510 in FIG. 5.
Figure 6B:
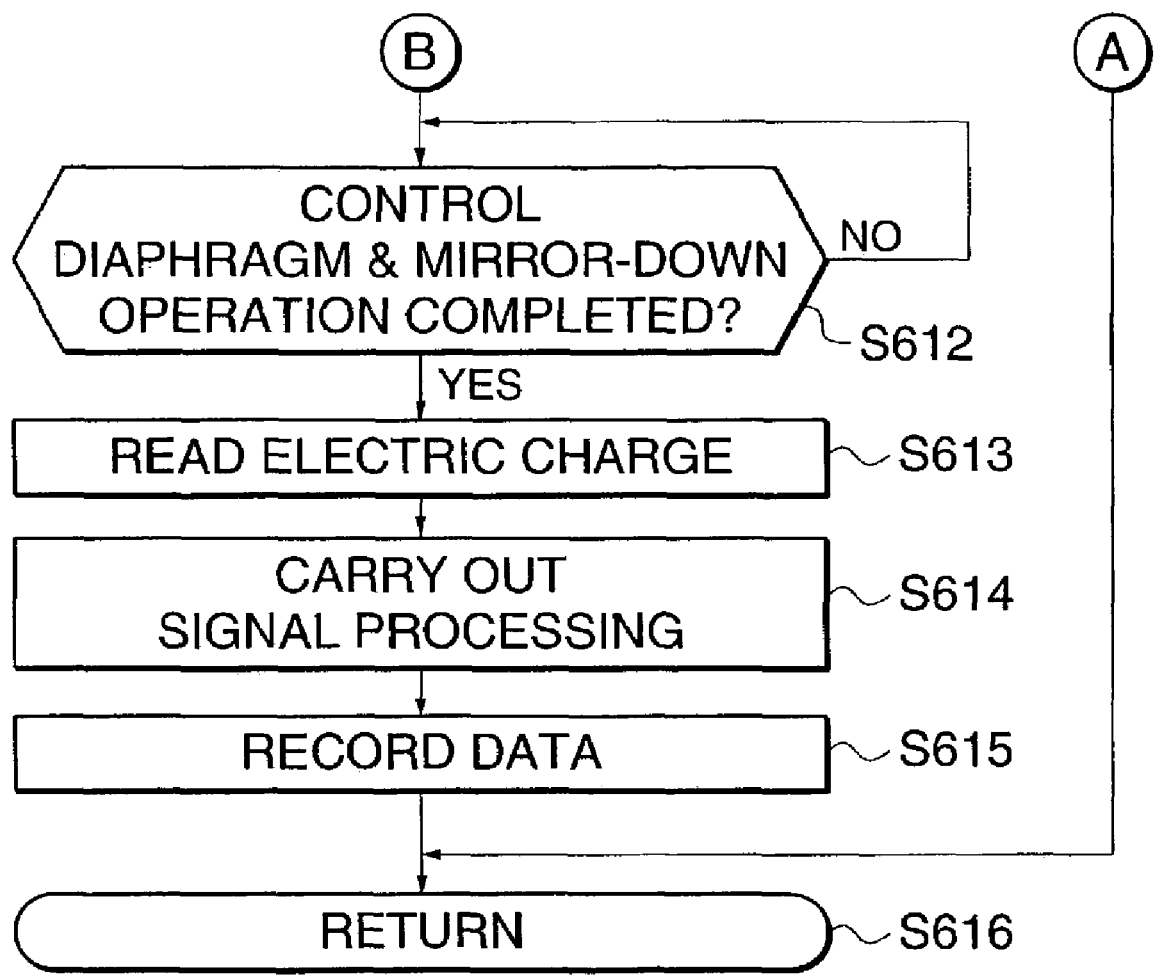

FIGS. 6A-6B is a flowchart of the switch SW2 interrupt process carried out during the operations in steps S505 to S510 in FIG. 5.

First, in step S602, it is determined whether the taking lens 107 is in an in-focus state or not. Then, when the taking lens 107 is brought into the in-focus state, the process proceeds to step S603. On the other hand, when the taking lens 107 is in the in-focus state, the process proceeds to step S616 without shooting.

In step S603, a mirror-up operation is carried out through control of the mirror driving circuit 401, and then the diaphragm 122 is driven through control of the diaphragm control circuit 415 in the next step S604, so as to assume an exposure value calculated in step S507 in FIG. 5 described above. When the mirror driving and the diaphragm control are completed (YES in step S605), the process proceeds to step S606 in which the shutter driving circuit 403 is controlled such that the shutter screen (front screen) 118 is allowed to travel and the shutter 117 is set in an open state. Next, the process proceeds to step S607 in which accumulation of electric charge in the image pickup element 120 is started. When a time point corresponding to the shutter speed calculated in step S507 in FIG. 5 described above has elapsed (YES in step S607a), the process proceeds to the next step S608 in which the accumulation of electric charge in the image pickup element 120 is ended.

Next, the process proceeds to step S609 in which the shutter screen (rear screen) 118 is caused to travel through control of the shutter driving circuit 403, thereby setting the shutter 117 into a closed state. Next, in step S610, a mirror-down operation is carried out through control of the mirror driving circuit 401. Then, in the next step S611, the diaphragm 122 is set into a full-open state through control of the diaphragm control circuit 415. Next, in step S612, when the mirror driving and the diaphragm control are completed (YES in step S612), the process proceeds to step S613 in which the electric charge accumulated in the image pickup element 120 is read and stored in the RAM 405. Then, in the next step S614, data stored in the RAM 405 is subjected to signal processing by the signal processing circuit 406 for converting the stored data into image data. In the next step S615, the image data is written and recorded in the flash memory 407. After this step S615 is executed, the process proceeds to the next step S616 to terminate the present SW2 interrupt process subroutine.

Next, the foreign substance detecting process of the digital single-lens reflex camera 100 as an image pickup apparatus according to the present embodiment will be described with reference to FIG. 7.

FIG. 7 is a flowchart of the foreign substance detecting process carried out in step S502 in FIG. 5.

When a foreign substance detecting subroutine is called in step S502 in FIG. 5, the foreign substance detecting process is started.

First, in step S702, the lens CPU 417 controls the diaphragm control circuit 415 based on data of communication with the camera CPU 409, thereby driving the diaphragm driving motor 414 and setting the diaphragm blade 123 of the diaphragm 122 into a closed state, whereby a light flux entering through the taking lens 107 can be blocked.

Next, in step S703, a mirror-up operation is carried out through control of the mirror driving circuit 401, thereby blocking a light flux entering through the finder. Next, in step S704, the shutter driving circuit 403 is driven to cause the shutter screen (front screen) 118 to travel and set the shutter 117 into an open state.

In the next step S705, the image pickup element 120 is illuminated by turning on the LED 121. Then, while the image pickup element 120 is illuminated, the process proceeds to the next step S706 in which accumulation of electric charge in the light-receiving portion is started through control of the image pickup element 120. After a predetermined period of time has elapsed from the start of the electric charge accumulation (YES in step S706a), the process proceeds to the next step S707 in which the electric charge accumulation is terminated.

Next, in step S708, the LED 121 is turned off. Then, in the next step S709, the electric charge accumulated in the light-receiving portion of the image pickup element 120 is transferred to a transfer path, the electric charge for each pixel (image pickup signal) is read in succession as voltage, converted into digital image pickup data by an A/D converter, not shown, and stored in the RAM 405. Next, the process proceeds to step S710 in which a foreign substance detection calculating process is carried out to detect whether there is attachment of a foreign substance based on the image pickup data stored in the RAM 405.

After the foreign substance detection calculating process in step S710 described above is executed, the process proceeds to step S711 in which the shutter driving circuit 403 is driven to set the shutter 117 into the closed state, that is, returning the shutter into the initial state. Next, in step S712, a mirror-down operation is carried out through control of the mirror driving circuit 401. Then, in the next step S713, the diaphragm driving motor 414 is driven by the diaphragm control circuit 415 to set the diaphragm blade 123 of the diaphragm 122 into a full-open state. When the foreign substance detection process is completed, the process proceeds to the next step S714 to terminate the present foreign substance detecting process subroutine.

Figure 8:
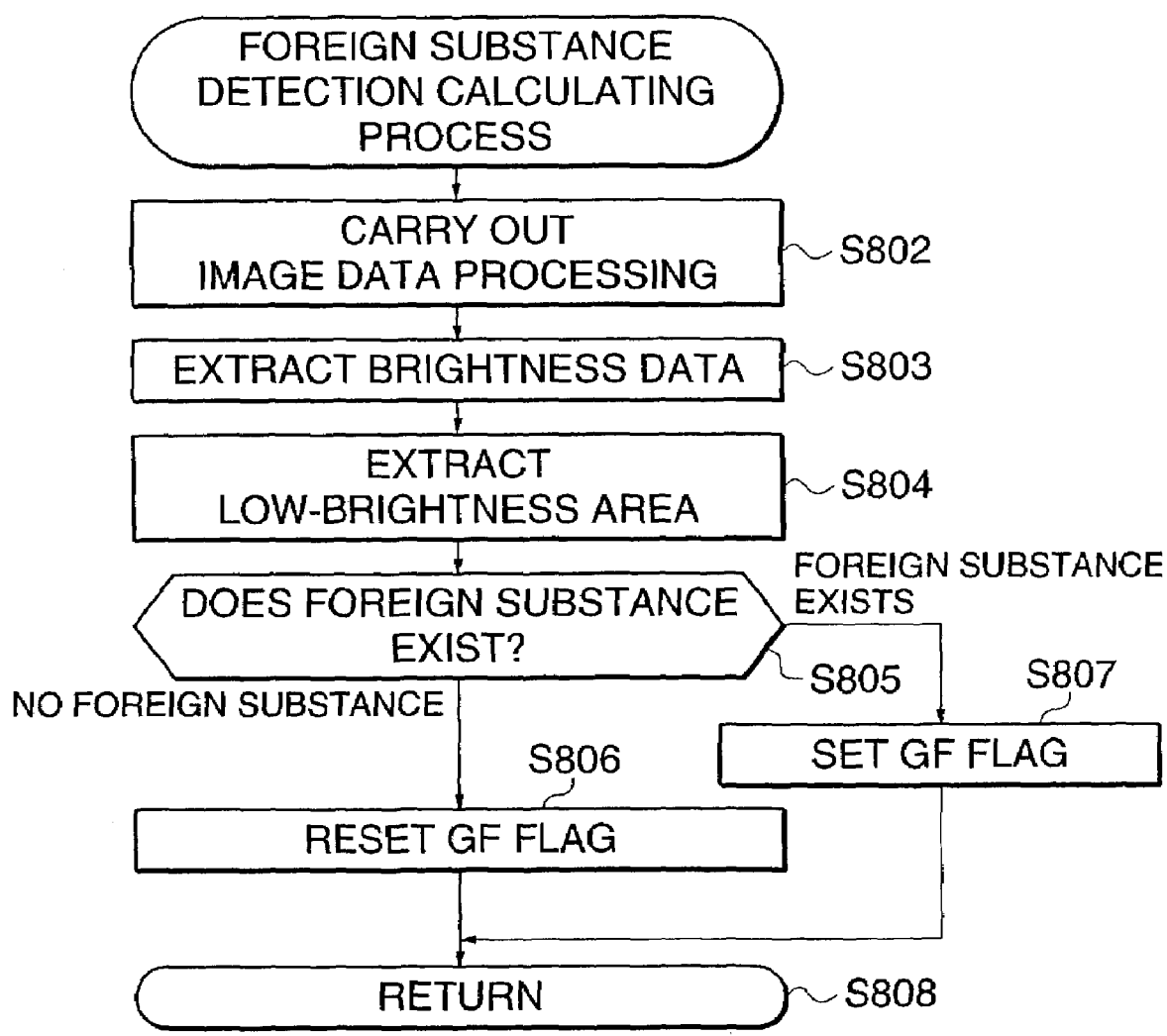
FIG. 8 is a flowchart showing a foreign substance detection calculating process carried out in step S710 in FIG. 7.

FIG. 8 is a flowchart of the foreign substance detection calculating process carried out in step S710 in FIG. 7.

When the foreign substance detection calculating process subroutine is called in step S710 in FIG. 7, first, in step S802, the image pickup data stored in the RAM 405 is subjected to image data processing by the signal processing circuit 406 for converting the image pickup data into image data, thereby generating brightness data and color data on pixel-by-pixel basis. Next, in step S803, only the brightness data is extracted from the image data comprised of the brightness data and the color data. Next, in step S804, it is determined whether the value of the brightness data is larger than a predetermined value or not.

Next, in step S805, when the low-brightness area extracted in step S804 is larger than the predetermined value, it is judged that there is attachment of a foreign substance, and the process proceeds to step S807. On the other hand, when the low-brightness area extracted in step S804 is not larger than the predetermined value, it is judged that there is no attachment of a foreign substance, and the process proceeds to step S806.

In step S806, the GF flag indicating foreign substance attachment is reset, and then the process proceeds to step S808. On the other hand, in step S807, the GF flag indicating foreign substance attachment is set, and then the process proceeds to the next step S808 in which the present foreign substance detection calculating process subroutine is terminated.

According to the above described foreign substance detection calculating process, a low-brightness area, whose brightness is lower than a predetermined value, is extracted from brightness data generated from image pickup data stored in the RAM 405 (step S803), it is judged that there is attachment of a foreign substance when the brightness in the extracted low-brightness area is larger than the predetermined value (YES in step S805), and the GF flag indicating the foreign substance attachment is set (step S807). As a result, it is possible to detect a foreign substance with reliability.

Second Embodiment

Next, a description will be given of a second embodiment of the present invention with reference to FIG. 9.

The basic construction of the image pickup apparatus according to the present embodiment is the same as that shown in FIGS. 1 to 4 according to the first embodiment described above, and therefore the following description will also refer to these figures as necessary.

The present embodiment is constructed such that when it is detected that the power switch of the camera main body 101 is switched from the ON state to the OFF state, the foreign substance detecting process as that in the first embodiment is carried out. With this construction, it is possible to conduct a preliminary check for the next shooting in advance. Since there is usually enough time after shooting is ended, a photographer will not be bothered by the foreign substance detection even if a certain period of time is taken to carry out the foreign substance detection. In addition, even if a foreign substance is detected and a foreign substance removing operation is required, the photographer can carry out the cleaning operation with calmness because there is enough time.

Figure 9:
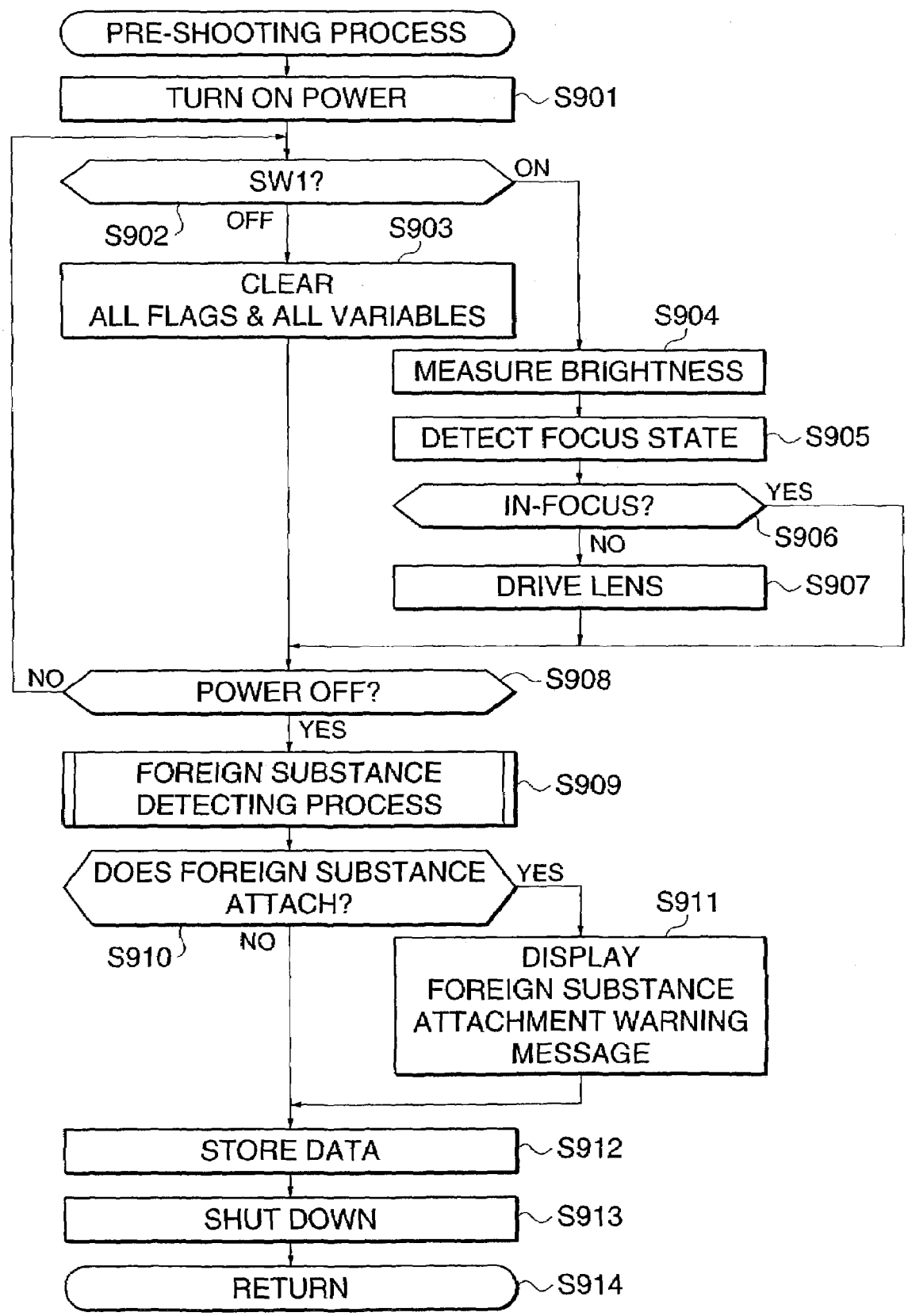
FIG. 9 is a flowchart showing a pre-shooting process carried out by a digital single-lens reflex camera as an image pickup apparatus according to a second embodiment of the present invention.

FIG. 9 is a flowchart of a pre-shooting process carried out by the digital single-lens reflex camera as an image pickup apparatus according to the second embodiment of the present invention.

Referring now to FIG. 9, first, when the power switch of the camera main body 101 is switched to an ON state, the camera CPU 409 reads a predetermined program for carrying out the present process, which is stored in the ROM (step S901).

Then, in step S902, detection is made of the state of the switch SW1 that is turned on by a first stroke of the release button. If the switch SW1 is determined to be in an ON state, the process proceeds to step S904 to carry out a pre-shooting. On the other hand, if the switch SW1 is determined to be in an OFF state, the process proceeds to step S903.

In step S903, to return the contents of the RAM 405 storing various kinds of parameters applied to control of the camera main body 101 into an initial state, all flags and all variables are cleared. Thereafter, the process proceeds to step S908.

In step S904, as a pre-shooting operation, the brightness of a subject is measured from a photometric sensor output of the photometric circuit 402 and calculation is made of an exposure condition at the time of shooting (exposure value and shutter speed). Then, in step S905, the focus state (defocus amount) of the taking lens 107 is detected using the focus detecting device 110.

Next, in step S906, it is determined whether the taking lens 107 is in an in-focus state or not, from whether the defocus amount detected in step S905 is smaller than a predetermined value or not. Then, when the defocus amount is smaller than the predetermined value and the taking lens 107 is in the in-focus state, the process proceeds to step S908. On the other hand, when the defocus amount is larger than the predetermined value and the taking lens 107 is in a defocus state, the process proceeds to step S907.

In step S907, the taking lens 107 is driven by the focus driving motor 412 so as to cancel the defocus amount detected in step S905. Thereafter, the process proceeds to step S908.

In step S908, it is determined whether the state of the power switch has been detected or not. When the power switch is set in an ON state, the process returns to step S902. On the other hand, When the power switch is set in an OFF state, the process proceeds to step S909.

In step S909, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S910 in which it is determined whether there is attachment of a foreign substance or not, from whether the GF flag is set or reset as a result of the foreign substance detecting process in step S909. Then, when the GF flag is set, it is judged that there is foreign substance attachment, the process proceeds to step S911. On the other hand, when the GF flag is reset, it is judged that there is no foreign substance attachment, the process proceeds to step S912.

In step S911, the LCD driving circuit 410 is controlled to cause the LCD (Liquid Crystal Display), not shown, to display a warning message for informing the photographer of the attachment of a foreign substance. Then, after the warning message is displayed, the process proceeds to the next step S912. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition at the time of the next shooting. To carry out the foreign substance detection and carry out the cleaning as necessary requires considerable time and efforts. However, these operations are carried out when shooting is ended, and thus an effect can be provided that the photographer will not be bothered and can carry out cleaning operation with calmness.

In step S912, if the recording of the image data and the storing of control data of the camera main body 101 are not completed, these data storing operations are carried out. When the storing operation is completed, the process proceeds to the next step S913 in which the control system of the camera main body 101 is shut down. Then, in the next step S914, the foreign substance detecting process subroutine is terminated.

If the photographer further depresses the release button while the operations in steps S904 to S907 described above are being carried out, the switch SW2 that is turned on by a second stroke of the release button is brought into an ON state and the camera CPU 409 carries out the switch SW2 interrupt process shown in FIGS. 6A-6B.

Third Embodiment

Next, a description will be given of a third embodiment of the present invention with reference to FIG. 10.

The basic construction of the image pickup apparatus according to the present embodiment is the same as that shown in FIGS. 1 to 4 according to the first embodiment described above, and therefore the following description also refers to these figures as necessary.

The present embodiment is constructed such that when the foreign substance detecting operation start switch of the camera main body 101 is operated, the foreign substance detecting process is started. With this construction, before start of shooting, after interchanging of a lens, or the like, if a user worries about attachment of a foreign substance, he/she operates the foreign substance detecting operation start switch, thereby carrying out foreign substance detection. Therefore, a situation can be avoided that the foreign substance detection is automatically carried out. As a result, the user will not be bothered by the foreign substance detection.

Figure 10:
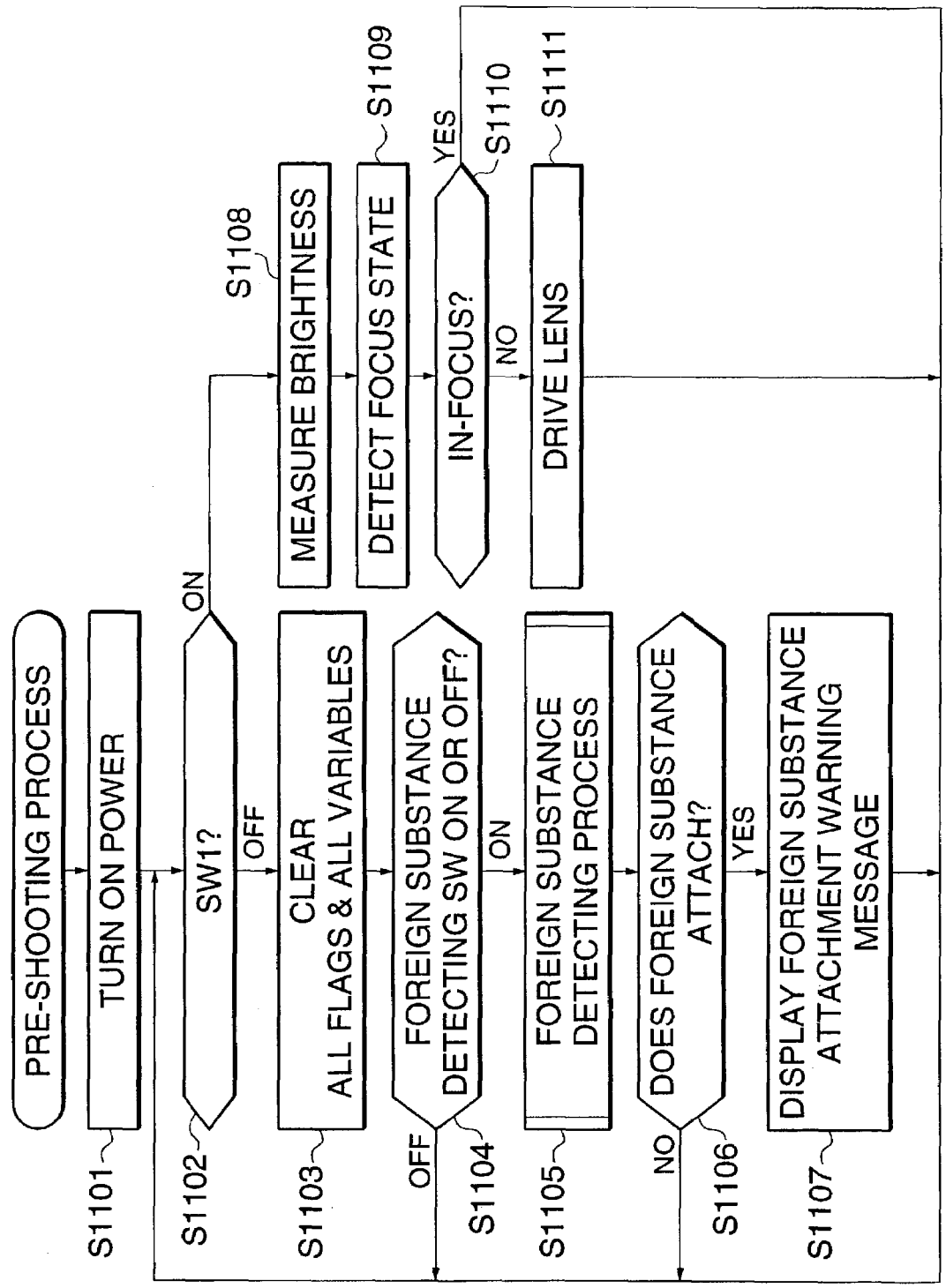
FIG. 10 is a flowchart showing a pre-shooting process carried out by a digital single-lens reflex camera as an image pickup apparatus according to a third embodiment of the present invention.

FIG. 10 is a flowchart showing a pre-shooting process carried out by the digital single-lens reflex camera as an image pickup apparatus according to the third embodiment of the present invention.

Referring now to FIG. 10, first, when the power switch of the camera main body 101 is switched to an ON state, the camera CPU 409 reads a predetermined program for carrying out the present process, which is stored in the ROM (step S1101).

Next, in step S1102, the state of the switch SW1 is detected, which is turned on by a first stroke of the release button. When the switch SW1 is determined to be in an ON state, the process proceeds to step S1108 to carry out a shooting preparation operation. On the other hand, when the switch SW1 is determined to be in an OFF state, the process proceeds to step S1103.

In step S1103, to return the contents of the RAM 405 storing various kinds of parameters applied to control of the camera main body 101 into an initial state, all flags and all variables are cleared. Next, in step S1104, the state of a foreign substance detecting switch is detected. When the foreign substance detecting switch is determined to be in an ON state, the process proceeds to step S1105. On the other hand, when the foreign substance detecting switch is determined to be in an OFF state, the process returns to step S1102.

In step S1105, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S1106 in which it is determined whether there is attachment of a foreign substance from whether the GF flag is set or reset as a result of the foreign substance detecting process in step S1105. Then, when the GF flag is set, that is, if it is judged that there is foreign substance attachment, the process proceeds to step S1107. On the other hand, when the GF flag is reset, that is, if it is judged that there is no foreign substance attachment, the process returns to step S1102.

In step S1107, the LCD driving circuit 410 is controlled to cause the LCD (Liquid Crystal Display), not shown, to display a warning message for informing the photographer of the attachment of a foreign substance. Then, after the warning message is displayed, the process returns to step S1102. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition.

It should be noted that steps S1108 to S1111 in FIG. 10 are the same as steps S507 to S510 in FIG. 5 according to the first embodiment described above, and therefore description thereof is omitted. Also, as is the case with the first embodiment, when the power switch is turned off, all of the processes are immediately terminated, and when the power switch is again turned on, the processing starting from step S1102 is again carried out.

Also, when the photographer further depresses the release button while the operations in steps S1108 to S1111 described above are being carried out, the switch SW2 that is turned on by a second stroke of the release button is brought into an ON state and the camera CPU 409 carries out the interrupt process shown in FIGS. 6A-6B.

As described above, according to the third embodiment, the foreign substance detecting process operation is carried out in response to the photographer's operation, thereby providing an effect that before shooting, immediately after the interchanging of a lens, or the like, if the photographer worries about attachment of a foreign substance, it is possible for him/her to easily confirm whether there is foreign substance attachment in advance. Also, a situation can be avoided that the foreign substance detection is automatically carried out, thereby providing an effect that the photographer will not be bothered by a situation where the foreign substance detection is suddenly started during shooting.

Fourth Embodiment

Next, a description will be given of a fourth embodiment of the present invention with reference to FIG. 11.

The basic construction of the image pickup apparatus according to the present embodiment is the same as that shown in FIGS. 1 to 4 according to the first embodiment described above, and therefore the following description also refers to these figures as necessary.

The present embodiment is constructed such that when a situation is detected that the taking lens 17 is attached to the camera main body 101, the foreign substance detecting process is automatically started. With this construction, it is possible to automatically check whether there is attachment of a foreign substance after lens interchanging when the foreign substance attachment tends to occur. In addition, when the interchangeable lens 102 is removed from the camera main body 101 during foreign substance removing operation and the interchangeable lens 102 is mounted onto the camera main body 101 after cleaning is carried out using a blower or the like, rechecking as to foreign substance attachment after the cleaning is also automatically carried out, thereby making it possible to check whether there is attachment of a foreign substance with efficiency.

Figure 11:
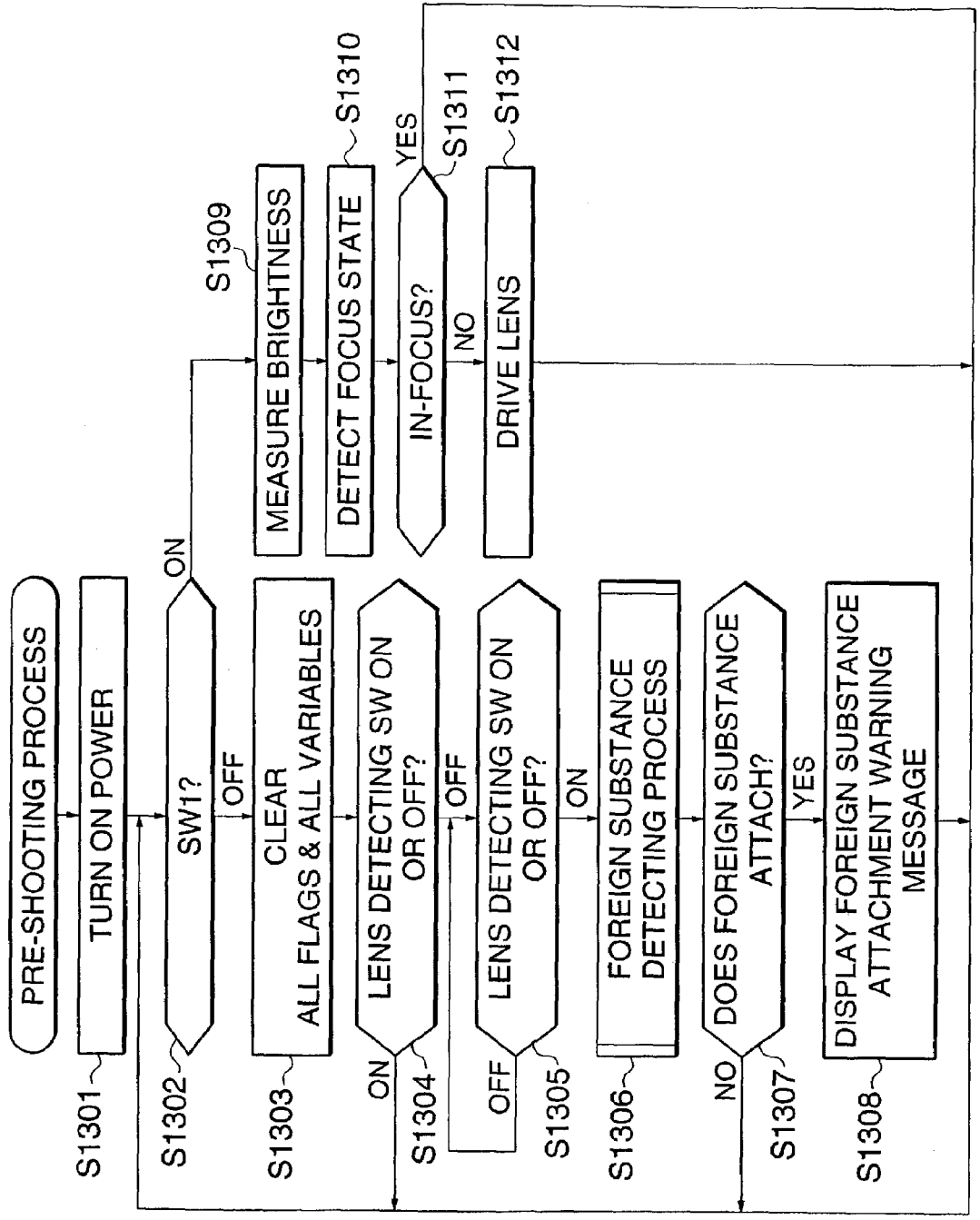
FIG. 11 is a flowchart showing a pre-shooting process carried out by a digital single-lens reflex camera as an image pickup apparatus according to a fourth embodiment of the present invention.

FIG. 11 is a flowchart showing a pre-shooting process carried out by the digital single-lens reflex camera 100 as an image pickup apparatus according to the fourth embodiment of the present invention.

Referring now to FIG. 11, first, when the power switch of the camera main body 101 is switched to an ON state, the camera CPU 409 reads a predetermined program for carrying out the present process, which is stored in the ROM (step S1301).

Next, in step S1302, detection is made of the state of the switch SW1 that is turned on by a first stroke of the release button. When the switch SW1 is determined to be in an ON state, the process proceeds to step S1309 to carry out a shooting preparation operation. On the other hand, when the switch SW1 is determined to be in an OFF state, the process proceeds to step S1303.

In step S1303, to return the contents of the RAM 405 storing various kinds of parameters applied to control of the camera main body 101 into an initial state, all flags and all variables are cleared. Next, in step S1304, detection is made of the state of a taking lens detecting switch. When the lens detecting switch showing a state where the interchangeable lens 102 is attached to the camera main body 101 is set in an ON state, the process returns to step S1302. On the other hand, when the taking lens is removed from the camera main body 101 and the lens detecting switch is set in an OFF state, the process proceeds to step S1305.

In step S1305, the detection of the state of the taking lens detecting switch is again carried out and the operation in this step S1305 is repeatedly carried out until a situation is detected that the interchangeable lens 102 is attached to the camera main body 101 and the lens detecting switch is turned on. Then, immediately when it is detected that the lens detecting switch is turned on, the process proceeds to the next step S1306.

In step S1306, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S1307 in which it is determined whether there is attachment of a foreign substance from whether the GF flag is set or reset as a result of the foreign substance detecting process in step S1306. Then, when the GF flag is set, that is, if it is judged that there is foreign substance attachment, the process proceeds to step S1308. On the other hand, when the GF flag is reset, that is, if it is judged that there is no foreign substance attachment, the process returns to step S1302.

In step S1308, the LCD driving circuit 410 is controlled to cause the LCD (Liquid Crystal Display), not shown, to display a warning message for informing the photographer of the attachment of a foreign substance. Then, after the warning message is displayed, the process returns to the next step S1302. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition.

It should be noted that steps S1309 to S1312 in FIG. 11 are the same as steps S507 to S510 in FIG. 5 according to the first embodiment described above, and therefore description thereof is omitted. Also, as is the case with the first embodiment, when the power switch is turned off, all of the processing are immediately terminated and, when the power switch is again turned on, the processing starting from step S1302 is again carried out.

When the photographer further depresses the release button while the operations in steps S1309 to S1312 shown in FIG. 11 are being carried out, the switch SW2 that is turned on by a second stroke of the release button is brought into an ON state and the camera CPU 409 carries out the interrupt process shown in FIGS. 6A-6B.

As described above, according to the present embodiment, it is possible to automatically carry out the foreign substance detecting process operation after the interchanging of the interchangeable lens 102 when the intrusion of a foreign substance tends to occur. In addition, when the interchangeable lens 102 is attached to the camera main body 101 after the interchangeable lens 102 is removed from the camera main body 101 and cleaning is carried out using a blower or the like to carry out a foreign substance removing operation, rechecking as to foreign substance attachment after the cleaning is also automatically carried out. This provides an effect that it is possible to check whether there is attachment of a foreign substance with efficiency.

Fifth Embodiment

Next, a description will be given of a fifth embodiment of the present invention with reference to FIG. 12.

The basic construction of the image pickup apparatus according to the present embodiment is the same as that shown in FIGS. 1 to 4 according to the first embodiment described above, and therefore the following description also refers to these figures as necessary.

The present embodiment is constructed such that the number of times the release button of the camera main body 101 is depressed, that is, the number of times shooting is carried out is counted and, when the count value obtained by counting after the last foreign substance removing operation reaches a predetermined value, the foreign substance detecting process is carried out. With this construction, it is possible to avoid a situation where the foreign substance detecting operation is frequently carried out. This is very effective in the case of indoor usage or under a usage condition where the lens interchanging is not frequently carried out.

Also, the present embodiment may be constructed such that when the count value exceeds the predetermined value and the power switch is switched from an OFF state to an ON state, the foreign substance detecting process operation is carried out. With this construction, it can be avoided that the foreign substance detecting process operation is suddenly carried out during shooting, which further improves operability.

Figure 12:
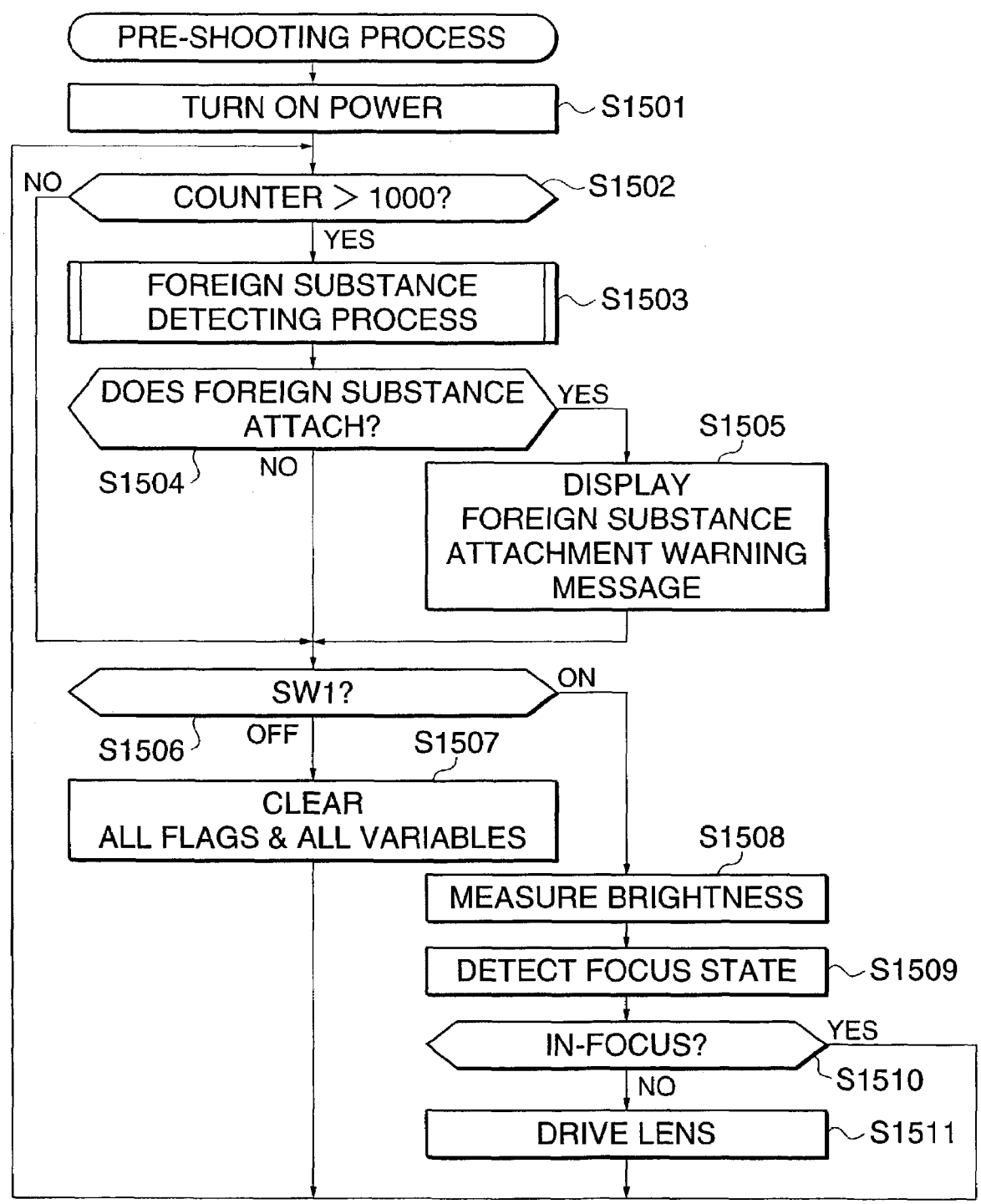
FIG. 12 is a flowchart showing a pre-shooting process carried out by a digital single-lens reflex camera as an image pickup apparatus according to a fifth embodiment of the present invention.

FIG. 12 is a flowchart showing a pre-shooting process carried out by the digital single-lens reflex camera as an image pickup apparatus according to the fifth embodiment of the present invention.

Referring now to FIG. 12, first, when the power switch of the camera main body 101 is switched to an ON state, the camera CPU 409 reads a predetermined program for carrying out the present process, which is stored in the ROM (step S1501).

Next, in step S1502, it is determined whether the count value of a counter (COUNTER) that is counted up by one each time the release button is stroked or a foreign substance detecting process (step S1503), described later, is carried out is greater than 1000. Then, when "COUNTER>1000" holds, the process proceeds to the next step S1503. On the other hand, when "COUNTER>1000" does not hold, the process proceeds to step S1506.

In step S1503, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S1504 in which it is determined whether there is attachment of a foreign substance from whether the GF flag is set or reset as a result of the foreign substance detecting process in step S1503. Then, when the GF flag is set, that is, if it is judged that there is foreign substance attachment, the process proceeds to the next step S1505. On the other hand, when the GF flag is reset, that is, if it is judged that there is no foreign substance attachment, the process proceeds to step S1506.

In step S1505, the LCD driving circuit 410 is controlled to cause the LCD (Liquid Crystal Display), not shown, to display a warning message for informing the photographer of the attachment of a foreign substance. Then, after the warning message is displayed, the process proceeds to step S1506. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition. Then, when the camera main body 101 is set in the cleaning mode, the count value of the counter (COUNTER) is reset so that the counter (COUNTER) can count the number of times the release button is depressed after the cleaning operation is started.

In step S1506, detection is made of the state of the switch SW1 that is turned on by a first stroke of the release button. When the switch SW1 is determined to be in the ON state, the process proceeds to step S1508 to carry out a shooting preparation operation. On the other hand, when the switch SW1 is determined to be in the Off state, the process proceeds to step S1507.

In step S1507, to return the contents of the RAM 405 storing various kinds of parameters applied to control of the camera main body 101 into an initial state, all flags and all variables are cleared. However, only the count value of the number of times of depression of the release button is held.

It should be noted that steps S1508 to S1511 in FIG. 12 are the same as steps S507 to S510 in FIG. 5 according to the first embodiment described above, and therefore description thereof is omitted. However, when the process of step S1511 is completed, the process returns to step S1502. Also, as is the case with the first embodiment, when the power switch is turned off, all of the operations are immediately terminated, and when the power switch is again turned on, the processing starting from step S1502 is again carried out.

Figure 13A:
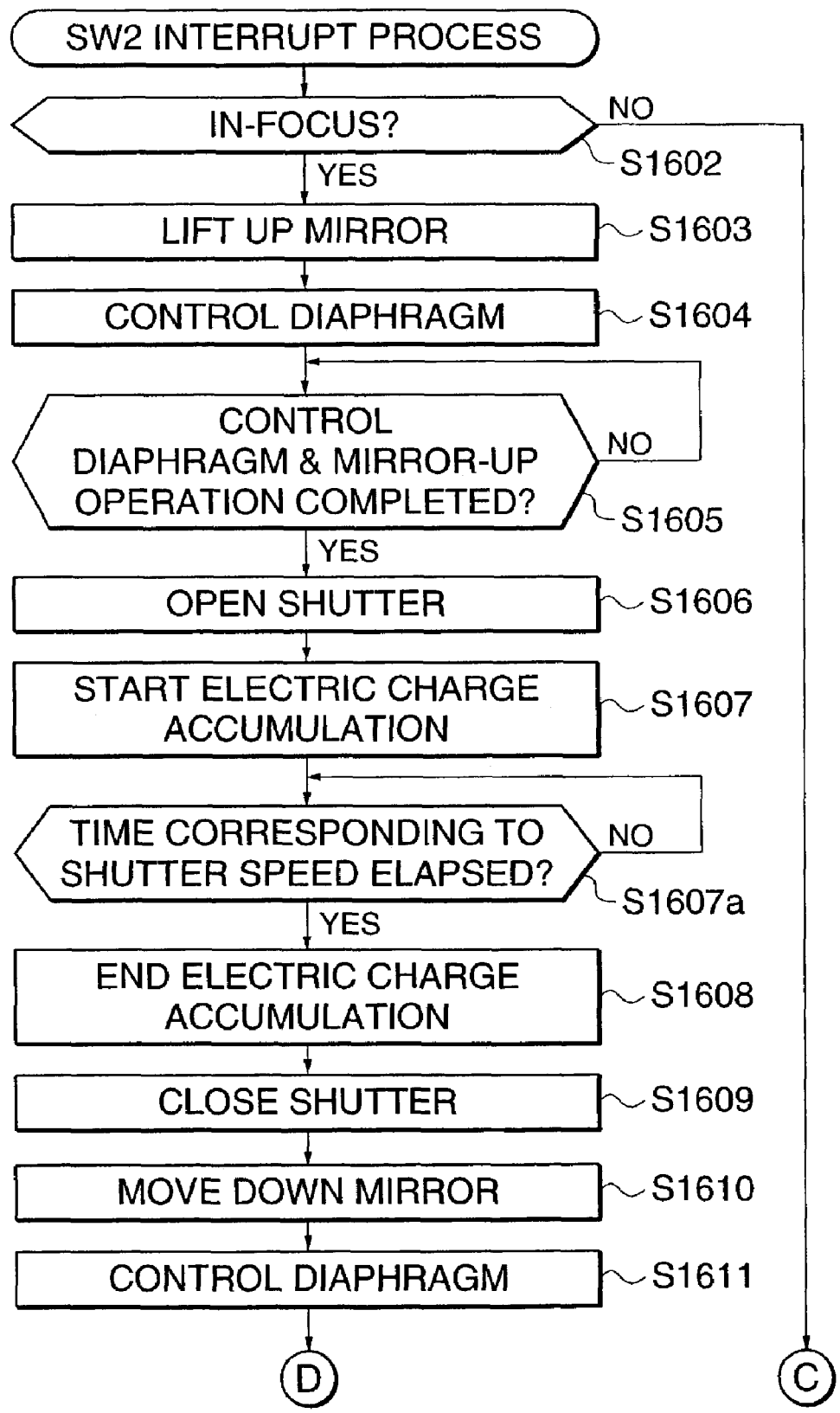
FIGS. 13A-13B is a flowchart showing a switch SW2 interrupt process carried out during operations in steps S1506 to S1511 in FIG. 12.
Figure 13B:
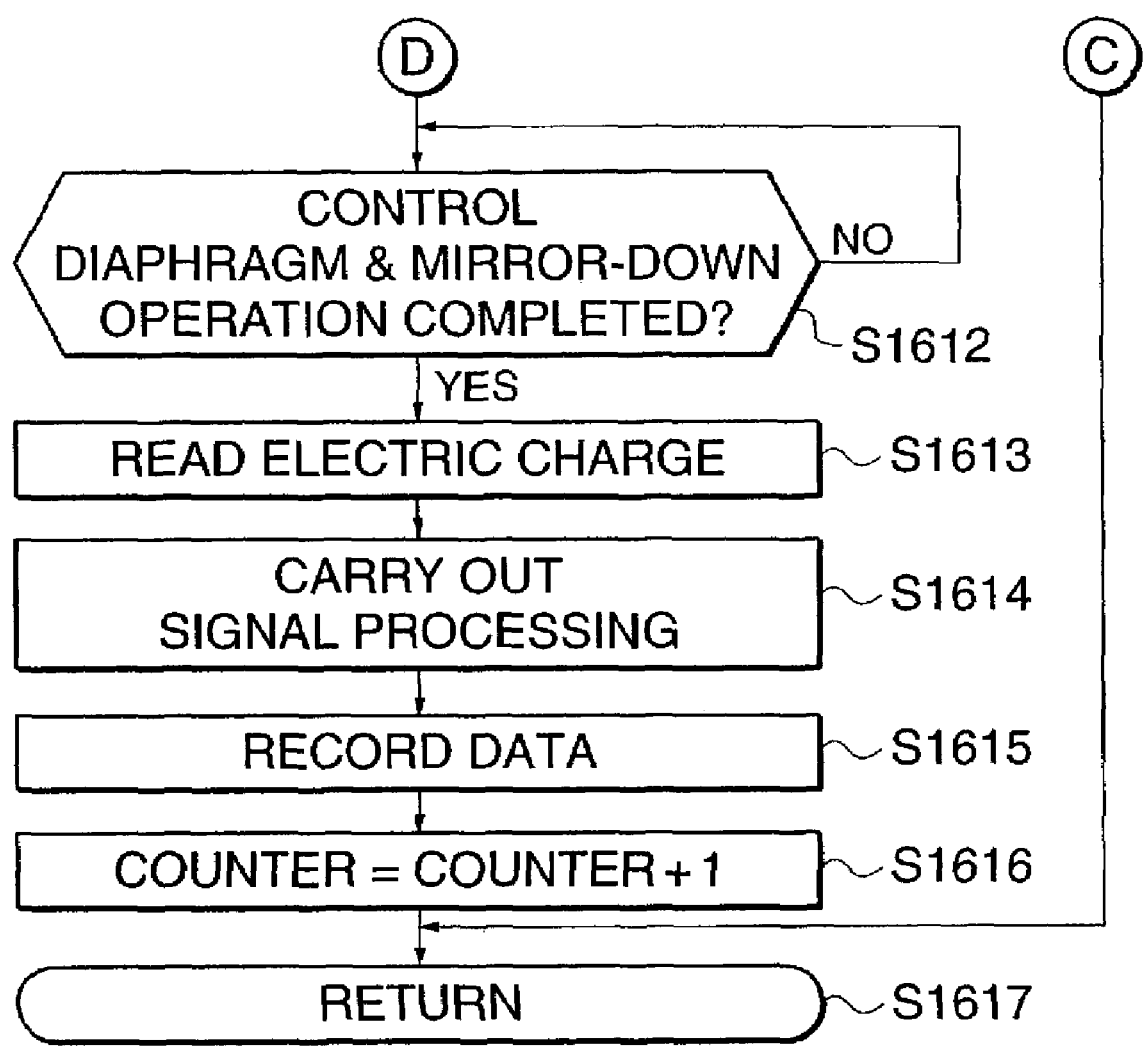

When the photographer further depresses the release button while the operations in steps S1508 to S1511 shown in FIG. 12 are being carried out, the switch SW2 that is turned on by a second stroke of the release button is brought into an ON state and the camera CPU 409 carries out the interrupt process shown in FIGS. 13A-13B.

It should be noted that steps S1602 to S1615 and step S1617 in FIGS. 13A-13B are the same as steps S602 to S616 in FIGS. 6A-6B according to the first embodiment, and therefore description thereof is omitted.

In FIGS. 13A-13B, when operations in steps S1602 to S1615 are completed, the process proceeds to the next step S1616 in which a value "1" is added to the counter value (COUNTER) of the counter that counts the number of times of depression of the release button, thus carrying out a count-up operation. In the next step S1617, this release subroutine is terminated.

As described above, according to the present embodiment, each time the release button is stroked or the foreign substance detecting process is carried out in the camera main body 101 (step S1503), the count value of the counter is counted up by one (step S1616). When the count value of the counter becomes greater than 1000 (YES in step S1502), the foreign substance detecting process operation is carried out (step S1503). As a result, frequent execution of the foreign substance detecting process operation can be avoided. This is very effective in the case of indoor usage or under a usage condition where the lens interchanging is not carried out frequently.

Further, when the count value of the counter is greater than 1000 and the power switch is switched from the OFF state to the ON state, it is determined whether the count value of the counter reaches the predetermined value immediately after the switching (step S1502) and the foreign substance detecting process is carried out (step S1503). Therefore, a situation can be avoided that the foreign substance detecting process operation is suddenly carried out during shooting, which further improves operability.

Sixth Embodiment

Next, a description will be given of a sixth embodiment of the present invention with reference to FIG. 14.

The basic construction of the image pickup apparatus according to the present embodiment is the same as that shown in FIGS. 1 to 4 according to the first embodiment described above, and therefore the following description also refers to these figures as necessary.

The present embodiment is constructed such that when the control mode of the camera main body 101 is switched from a shooting mode to a reproduction mode, the foreign substance detecting process is automatically carried out. With this construction, the foreign substance detecting process is carried out during reproduction of an image during which shooting is not usually carried out at once and the image pickup element 120 is not driven. As a result, the photographer will not be bothered by the foreign substance detection and it is possible for the photographer to use time with efficiency.

Figure 14:
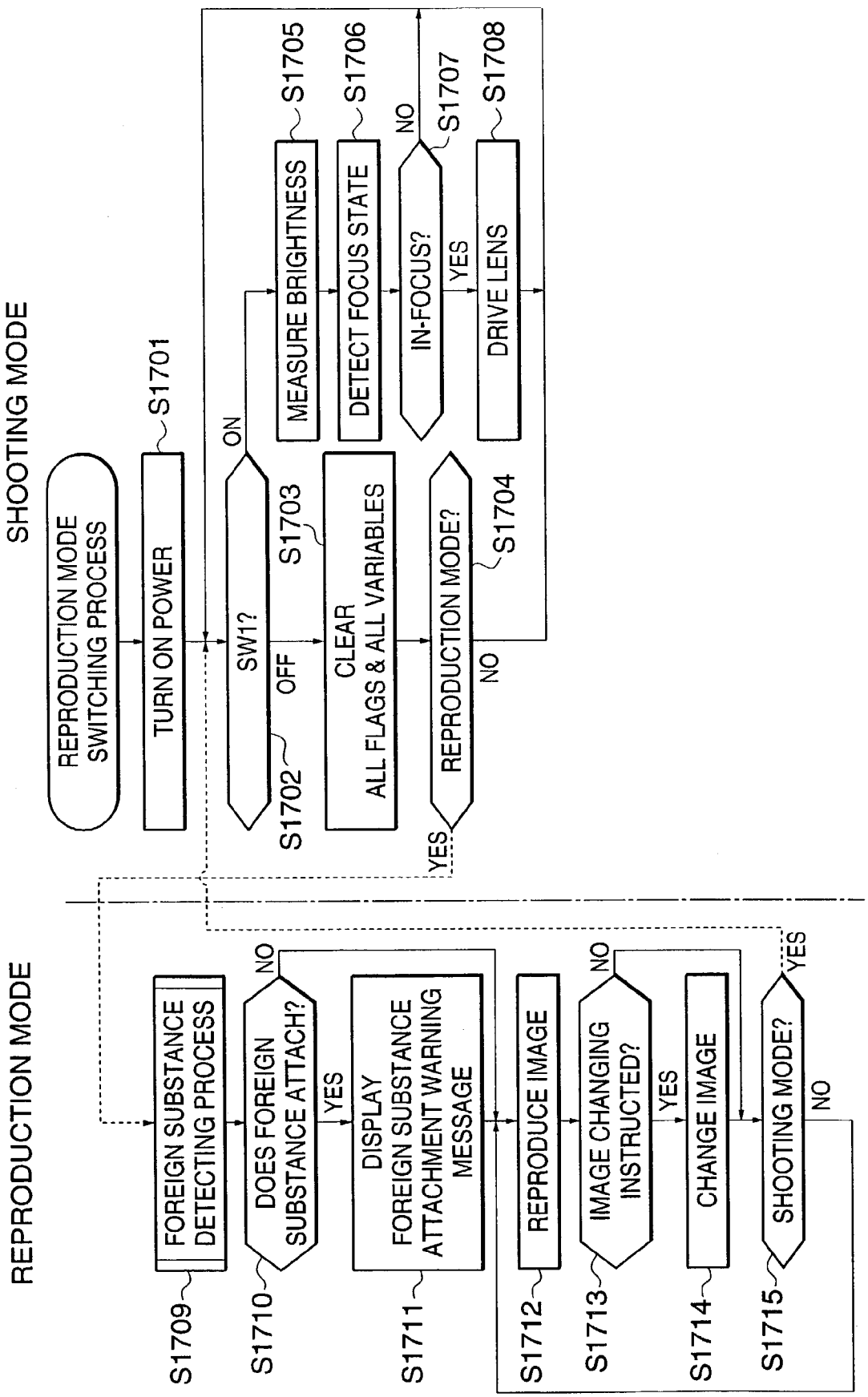
FIG. 14 is a flowchart showing a reproduction mode switching process carried out by a digital single-lens reflex camera as an image pickup apparatus according to a sixth embodiment of the present invention.

FIG. 14 is a flowchart showing a reproduction mode switching process carried out by the digital single-lens reflex camera as an image pickup apparatus according to the sixth embodiment of the present invention.

Referring now to FIG. 14, first, when the power switch of the camera main body 101 is switched to an ON state, the camera CPU 409 reads a predetermined program for carrying out the present process, which is stored in the ROM (step S1701).

In step S1702, detection is made of the state of the switch SW1 that is turned on by the first stroke of the release button. Then, when the switch SW1 is determined to be in the ON state, the process proceeds to step S1705 to carry out a shooting preparation operation. On the other hand, when the switch SW1 is determined to be in the OFF state, the process proceeds to step S1703.

In step S1703, to return the contents of the RAM 405 storing various kinds of parameters applied to control of the camera main body 101 into an initial state, all flags and all variables are cleared. Next, in step S1704, detection is made of the state of a mode setting switch of the camera main body 101. When the mode setting switch is set in the shooting mode, the process returns to step S1702. On the other hand, when the mode setting switch is set in the reproduction mode, it is judged that the control mode has just shifted to the reproduction mode, and the process proceeds to step S1709 to shift the control mode to the reproduction mode and carry out a foreign substance detecting process subroutine.

This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S1710 in which it is determined whether there is attachment of a foreign substance from whether the GF flag is set or reset as a result of the foreign substance detecting process in step S1709. Then, when the GF flag is set, that is, when it is judged that there is foreign substance attachment, the process proceeds to step S1711. On the other hand, when the GF flag is reset, that is, when it is judged that there is no foreign substance attachment, the process proceeds to step S1712.

In step S1711, the LCD driving circuit 410 is controlled to cause the LCD (Liquid Crystal Display), not shown, to display a warning message for informing the photographer of the attachment of a foreign substance. Then, after the warning message is displayed, the process proceeds to step S1712. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition.

With this construction, when it is judged that the control mode of the camera main body 101 is switched from the shooting mode to the reproduction mode (YES in step S1704), the foreign substance detecting process is carried out (step S1709). As a result, the photographer will not be bothered by the foreign substance detection and it is possible for the photographer to use time with efficiency.

Next, in step S1712, image data stored in the RAM 405 is read and displayed on the LCD of the camera main body 101. Next, in step S1713, it is determined whether an operation for changing an image to be reproduced has been carried out. Then, when the changing of the image to be reproduced has been carried out, the process proceeds to step S1714. On the other hand, when the changing of the image to be reproduced has not been carried out, the process proceeds to step S1715.

In step S1714, the changed image data is read from the RAM 405, thus carrying out the changing of the image to be reproduced. After the operation in step S1714 is carried out, the process proceeds to step S1715.

In step S1715, detection is made of the state of the mode setting switch of the camera main body 101. When the mode setting switch is set in the shooting mode, the process returns to step S1702 for the control mode to shift to the shooting mode. On the other hand, when the mode setting switch is set in the reproduction mode, the process returns to step S1712.

It should be noted that steps S1705 to S1708 in FIG. 14 are the same as steps S507 to S510 in FIG. 5 according to the first embodiment described above, and therefore description thereof is omitted. Also, as is the case with the first embodiment, when the power switch is turned off, all of the operations are immediately terminated, and when the power switch is again turned on, the processing starting from step S1702 is again carried out.

When the photographer further depresses the release button while the operations in steps S1705 to S1708 in FIG. 14 are being carried out, the switch SW2 that is turned on by a second stroke of the release button is brought into an ON state and the camera CPU 409 carries out the interrupt process shown in FIGS. 6A-6B.

Seventh Embodiment

Next, a seventh embodiment of the present invention will be described with reference to FIG. 15.

The basic construction of the image pickup apparatus according to the present embodiment is the same as that shown in FIGS. 1 to 4 according to the first embodiment described above, and therefore the following description also refers to these figures as necessary.

The present embodiment is constructed such that when the control mode of the camera main body 101 is switched from the reproduction mode to the shooting mode, the foreign substance detecting process is automatically carried out. This provides an effect that it is possible to automatically check the state of the camera main body 101 before shooting, as is the case with the first embodiment described above.

FIG. 15 is a flowchart showing a reproduction mode switching process carried out by the digital single-lens reflex camera as an image pickup apparatus according to the seventh embodiment of the present invention.

In FIG. 15, first, when the power switch of the camera main body 101 is turned on, the camera CPU 409 reads a predetermined program for carrying out the present process from the ROM (step S1901).

Next, in step S1902, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S1903 in which it is determined whether there is attachment of a foreign substance from whether the GF flag is set or reset as a result of the foreign substance detecting process in step S1902. Then, when the GF flag is set, that is, when it is judged that there is foreign substance attachment, the process proceeds to step S1904. On the other hand, when the GF flag is reset, that is, when it is judged that there is no foreign substance attachment, the process proceeds to step S1905.

In step S1904, the LCD driving circuit 410 is controlled to cause the LCD (Liquid Crystal Display), not shown, to display a warning message for informing the photographer of the attachment of a foreign substance. Then, after the warning message is displayed, the process proceeds to the next step S1905. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition.

In step S1905, detection is made of the state of the switch SW1 that is turned on by a first stroke of the release button. When the switch SW1 is determined to be in an ON state, the process proceeds to step S1906 to carry out a shooting preparation operation. On the other hand, when the switch SW1 is determined to be in an OFF state, the process proceeds to step S1910.

In step S1910, to return the contents of the RAM 405 storing various kinds of parameters applied to control of the camera main body 101 into an initial state, all flags and all variables are cleared. Next, in step S1911, detection is made of the state of the mode setting switch of the camera main body 101. When the mode setting switch is set in the shooting mode, the process returns to step S1905. On the other hand, when the mode setting switch is set in the reproduction mode, the process returns to step S1912 to shift the control mode to the reproduction mode.

In step S1912, image data stored in the RAM 405 is read and displayed on the LCD of the camera main body 101. Next, in step S1913, it is determined whether an operation for changing an image to be reproduced has been carried out. Then, when the changing of the image to be reproduced has been carried out, the process proceeds to step S1914. On the other hand, when the changing of the image to be reproduced has not been carried out, the process proceeds to step S1915.

In step S1914, the changed image data is read from the RAM 405, and after the changing of the reproduction image has been carried out, the process proceeds to the next step S1915.

In step S1915, the state of the mode setting switch of the camera main body 101 is detected, and when the mode setting switch is set in the shooting mode, the process returns to step S1902 to shift the control mode to the shooting mode. On the other hand, when the mode setting switch is set in the reproduction mode, the process returns to step S1912.

It should be noted that steps S1906 to S1909 in FIG. 15 are the same as steps S507 to S510 in FIG. 5 according to the first embodiment described above, and therefore description thereof is omitted. Further, as is the case with the first embodiment, when the power switch is turned off, all of the operations are immediately terminated, and when the power switch is again turned on, the processing starting from step S1901 is again carried out.

When the photographer further depresses the release button while the operations in steps S1906 to S1909 in FIG. 15 are being carried out, the switch SW2 that is turned on by a second stroke of the release button is brought into an ON state and the camera CPU 409 carries out the interrupt process shown in FIGS. 6A-6B.

As described above, according to the present embodiment, it is necessarily checked whether there is attachment of a foreign substance when the control mode is switched to the shooting mode. This provides an effect that it is possible to confirm the state of the camera main body 101 before shooting.

Eighth Embodiment

Next, an eighth embodiment of the present invention will be described with reference to FIG. 16.

The basic construction of the image pickup apparatus according to the present embodiment is the same as that shown in FIGS. 1 to 4 according to the first embodiment described above, and therefore the following description also refers to these figures as necessary.

The present embodiment is constructed such that when it is detected that a memory card attached to the camera main body 101 to record image data has been replaced with a new memory card, the foreign substance detecting process is automatically carried out. When the memory card is removed from the camera main body 101 or immediately after the memory card is attached to the camera main body 101, it is impossible to carry out shooting at once because it is required to check the remaining capacity and state of the memory card. Therefore, by carrying out the foreign substance detecting process during this checking operation, it is possible to make effective use of time.

FIG. 16 is a flowchart showing a pre-shooting process carried out by the digital single-lens reflex camera as an image pickup apparatus according to the eighth embodiment.

In FIG. 16, first, when the power switch of the camera main body 101 is turned on, the camera CPU 409 reads a predetermined program for carrying out the present process from the ROM (step S2101).

Next, in step S2102, the state of the switch SW1 is detected, which is turned on by a first stroke of the release button. When the switch SW1 is determined to be in an ON state, the process proceeds to step S2108 to carry out the shooting preparation process. On the other hand, when the switch SW1 is determined to be in an OFF state, the process proceeds to step S2103.

In step S2103, to return the contents of the RAM 405 storing various kinds of parameters applied to control of the camera main body 101 into an initial state, all flags and all variables are cleared. Next, in step S2104, state detection is carried out to determine whether the memory card is attached to the camera main body 101, using a memory card state detecting switch. Then, when the memory card state detecting switch is set in an OFF state, that is, the memory card is not attached to the camera main body 101, the process proceeds to step S2105. On the other hand, when the memory card state detecting switch is set in an ON state, that is, the memory card is attached to the camera main body 101, the process returns to step S2102.

Next, in step S2105, a foreign substance detecting process subroutine is executed. This foreign substance detecting process subroutine is for detecting whether a foreign substance attaches to the optical filter 119 in the vicinity of the image pickup element 120 and is the same as the foreign substance detecting process (step S502 in FIG. 5) in the first embodiment described above. Therefore, description thereof is omitted.

Next, the process proceeds to step S2106 in which it is determined whether there is attachment of a foreign substance from whether the GF flag is set or reset as a result of the foreign substance detecting process in step S2105. Then, when the GF flag is set, that is, when it is judged that there is foreign substance attachment, the process proceeds to step S2107. On the other hand, when the GF flag is reset, that is, when it is judged that there is no foreign substance attachment, the process proceeds to step S2102.

In step S2107, the LCD driving circuit 410 is controlled to cause the LCD (Liquid Crystal Display), not shown, to display a warning message for informing the photographer of the attachment of a foreign substance. Then, after the warning message is displayed, the process returns to step S2102. The photographer recognizes the foreign substance attachment by looking at the contents of the warning message displayed on the LCD, so that he/she sets the camera main body 101 into a cleaning mode in which the foreign substance on the optical filter 119 is cleaned off using a blower or the like, thereby obtaining a state where it is possible to start shooting under a favorable condition.

It should be noted that steps S2108 to S2111 in FIG. 16 are the same as steps S507 to S510 in FIG. 5 according to the first embodiment described above, and therefore description thereof is omitted. Further, as is the case with the first embodiment, when the power switch is turned off, all of the operations are immediately terminated, and when the power switch is again turned on, the processing starting from step S2102 is again carried out.

When the photographer further depresses the release button while the operations in steps S2108 to S2111 described above are being carried out, the switch SW2 that is turned on by a second stroke of the release button is brought into an ON state and the camera CPU 409 carries out the interrupt process shown in FIGS. 6A-6B.

As described above, according to the present embodiment, at the time of replacement of the replacement of the memory card, shooting is never carried out. Therefore, by checking whether there is attachment of a foreign substance in the vicinity of the image pickup element 120 during the memory card replacement, it is possible to make effective use of labor and time required to carry out the foreign substance detection and it is possible for the photographer to start shooting without being anxious about attachment of a foreign substance.

In the present embodiment, the detection of the memory card state is carried out in the manner described above. However, the same detection may be carried out by detecting the open/closed state of a cover of a memory card loading portion.

Two or more of the first to eighth embodiments described above may be combined together to carry out the foreign substance detection, to provide the above-mentioned effects of the present invention.

It is to be understood that the object of the present invention may also be accomplished by supplying an image pickup apparatus with a program code of software which realizes the functions of any of the above-mentioned embodiments via a network such as the Internet, and causing a computer (or CPU or MPU) of the image pickup apparatus to read and execute the program code stored on a storage medium.

In this case, the program code itself read from the storage medium or the like realizes the novel functions of the camera CPU 409 of any of the above-mentioned embodiments, and hence the storage medium on which the program code is stored constitutes the present invention.

Examples of the storage medium or the like for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above-mentioned embodiments may be accomplished not only by executing a program code read out by a computer, but also by causing an OS (Operating System) or the like which operates on the computer to carry out a part or all of the actual operations based on instructions of the program code.

Furthermore, it is to be understood that the functions of any of the above-mentioned embodiments may be accomplished by writing a program code read out from the storage medium into an expansion board inserted into a computer or a memory provided in an expansion unit connected to the computer and then causing a CPU or the like provided in the expansion board or the expansion unit to carry out a part or all of the actual operations based on instructions of the program code.

What is claimed is:

1. An image pickup apparatus comprising: an image pickup apparatus body; a power switch provided in said image pickup apparatus body; a mirror supported by a hinge axis provided in said image pickup apparatus body; an image pickup optical system provided in said image pickup apparatus body; a foreign substance detecting device that detects a foreign substance in said image pickup apparatus body; and a controller that provides control such that said foreign substance detecting device is activated automatically when the power switch is turned from an OFF state to an ON state; wherein the foreign substance detecting device includes a lighting device for illuminating the image pickup optical system, wherein the lighting device is located between a lens and the image pickup optical system; wherein the controller actuates the hinge axis so that the mirror is movable between a mirror up position and a mirror down position; and wherein the controller actuates the hinge axis so that the mirror is in the mirror up position when the foreign substance detecting device is activated and the image pickup optical system is illuminated with the lighting device.

2. An image pickup apparatus according to claim 1, comprising an interchangeable taking lens.

3. An image pickup apparatus according to claim 1, wherein the lighting device is a light emitting diode.

4. An image pickup apparatus according to claim 1, further comprising an indicator for indicating the detection of a foreign substance by the foreign substance detecting device.

5. An image pickup apparatus according to claim 1, wherein the lighting device is a point light source.

6. An image pickup apparatus comprising:
an image pickup apparatus body;
a power switch provided in said image pickup apparatus body;
a foreign substance detecting device that performs a foreign substance detection operation to detect a foreign substance in said image pickup apparatus body; and
a controller that automatically activates said foreign substance detecting device when the power switch is switched from an ON state to an OFF state, and then shuts down when the foreign substance detecting device has finished the foreign substance detection operation.

7. An image pickup apparatus according to claim 6, comprising an interchangeable taking lens.

8. An image pickup apparatus according to claim 6, comprising an image pickup optical system provided in said image pickup apparatus body, and wherein said foreign substance detecting device detects a foreign substance attaching to said image pickup optical system.

9. An image pickup apparatus according to claim 6, wherein the lighting device is a light emitting diode.

10. An image pickup apparatus according to claim 6, further comprising an indicator for indicating the detection of a foreign substance by the foreign substance detecting device.

11. An image pickup apparatus according to claim 6, wherein the lighting device is a point light source.

12. A method of processing operation of an image pickup apparatus having an image pickup apparatus body, a mirror supported by a hinge axis provided in the image pickup apparatus body, a lighting device for illuminating an image pickup system provided in the image pickup apparatus body located between a lens and the image pickup system, a foreign substance detector provided in the image pickup apparatus body, and a power switch provided in the image pickup apparatus body, comprising: a foreign substance detecting step of detecting a foreign substance in the image pickup apparatus body; and a control step of providing control such that said foreign substance detecting step is executed automatically when the power switch is turned from on OFF state to an ON state; wherein said control step includes actuating the hinge axis so that the mirror is in the mirror up position, activating the lighting device to illuminate the image pickup system, and activating a foreign substance detector to perform the foreign substance detecting step.

13. A method of processing operation of an image pickup apparatus having an image pickup apparatus body, and a power switch provided in the image pickup apparatus body, comprising:
a foreign substance detecting step of detecting a foreign substance in the image pickup apparatus body;
a first control step of providing control such that said foreign substance detecting step is executed when the power switch is switched from an ON state to an OFF state; and
a second control step of providing control such operation of the image pickup apparatus is shut down after the foreign substance detecting step is completed.

14. A computer-readable storage medium storing a computer program for implementing a method of processing operation of an image pickup apparatus according to any of claims 12 to 13.

\* \* \* \* \*